United States Patent
Hosenpud

(10) Patent No.: US 9,829,996 B2
(45) Date of Patent: Nov. 28, 2017

(54) OPERATIONS IN A THREE DIMENSIONAL DISPLAY SYSTEM

(71) Applicant: zSpace, Inc., Sunnyvale, CA (US)

(72) Inventor: Jonathan J. Hosenpud, Mountain View, CA (US)

(73) Assignee: zSpace, Inc., Sunnyvale, CA (US)

( * ) Notice: Subject to any disclaimer, the term of this patent is extended or adjusted under 35 U.S.C. 154(b) by 255 days.

(21) Appl. No.: 13/926,200

(22) Filed: Jun. 25, 2013

(65) Prior Publication Data

US 2016/0041630 A1   Feb. 11, 2016

Related U.S. Application Data

(60) Provisional application No. 61/663,917, filed on Jun. 25, 2012.

(51) Int. Cl.
*G06F 3/0346* (2013.01)
*G06F 3/0481* (2013.01)
*G06F 3/0484* (2013.01)
*G06F 3/0354* (2013.01)
(Continued)

(52) U.S. Cl.
CPC .......... *G06F 3/0346* (2013.01); *G06F 3/0383* (2013.01); *G06F 3/03545* (2013.01); *G06F 3/0488* (2013.01); *G06F 3/04815* (2013.01); *G06F 3/04845* (2013.01); *G06F 2203/04101* (2013.01)

(58) Field of Classification Search
CPC ............. G06F 3/04815; G06F 3/04845; G06F 3/0488; G06F 2203/04101; G06F 3/0346; G06F 2203/04108; G06F 3/0383; G06T 19/00; G06T 2219/2016; G06T 15/20; G06T 17/00; G06T 19/20; H04N 13/0454; H04N 13/0456; H04N 13/00; H04N 13/0022
USPC .......................................... 345/419, 157, 158
See application file for complete search history.

(56) References Cited

U.S. PATENT DOCUMENTS

| | | | | |
|---|---|---|---|---|
| 5,850,206 | A * | 12/1998 | Kashiwagi | ............... G06T 17/00 345/157 |
| 6,342,878 | B1 * | 1/2002 | Chevassus | ............ G06F 3/0346 345/157 |
| 6,842,175 | B1 | 1/2005 | Schmalstieg et al. | |

(Continued)

OTHER PUBLICATIONS

"Illustrative Shadows: Integrating 3D and 2D Information Displays" Felix Ritter, et al, Magdeburg, Germany, Copyright 2003, pp. 1-8.

*Primary Examiner* — Jose Soto Lopez
(74) *Attorney, Agent, or Firm* — Meyertons Hood Kivlin Kowert & Goetzel, P.C.; Jeffrey C. Hood; Brian E. Moore

(57) ABSTRACT

System and method for invoking 2D and 3D operational modes of a 3D pointing device in a 3D presentation system. A 3D stereoscopic scene and a 2-dimensional (2D) scene are displayed concurrently via at least one stereoscopic display device. A current cursor position is determined based on a 6 degree of freedom 3D pointing device. The cursor is displayed concurrent with the 3D stereoscopic scene and the 2D scene, where the cursor operates in a 2D mode in response being inside a specified volume, where, in the 2D mode, the cursor is usable to interact with the 2D scene, and where the cursor operates in a 3D mode in response to being outside the specified volume, where, in the 3D mode, the cursor is usable to interact with the 3D stereoscopic scene.

28 Claims, 15 Drawing Sheets

(51) Int. Cl.
*G06F 3/038* (2013.01)
*G06F 3/0488* (2013.01)

(56) References Cited

U.S. PATENT DOCUMENTS

| | | | |
|---|---|---|---|
| 6,918,087 B1* | 7/2005 | Gantt | G06F 3/04815 715/737 |
| 9,053,562 B1* | 6/2015 | Rabin | G06T 19/00 |
| 9,619,104 B2* | 4/2017 | Xin | G06F 3/04815 |
| 2003/0204364 A1* | 10/2003 | Goodwin | G06F 3/016 702/152 |
| 2004/0210852 A1* | 10/2004 | Balakrishnan | G06F 3/038 715/856 |
| 2005/0251038 A1* | 11/2005 | Liang | G06T 19/00 600/437 |
| 2006/0114205 A1* | 6/2006 | Shen | G09G 3/3688 345/88 |
| 2010/0095206 A1* | 4/2010 | Kim | G06F 3/017 715/702 |
| 2010/0207880 A1* | 8/2010 | Shaver | G06F 3/0346 345/158 |
| 2011/0093778 A1* | 4/2011 | Kim | G06F 3/041 715/702 |
| 2011/0107270 A1* | 5/2011 | Wang | G06F 19/3437 715/850 |
| 2011/0126159 A1* | 5/2011 | Ko | G06F 3/04847 715/848 |
| 2011/0161843 A1* | 6/2011 | Bennett | G06F 3/14 715/760 |
| 2011/0164029 A1* | 7/2011 | King | G06F 3/04883 345/419 |
| 2011/0164034 A1 | 7/2011 | Bennett et al. | |
| 2011/0199301 A1* | 8/2011 | Zhao | G06F 1/3215 345/158 |
| 2011/0225538 A1* | 9/2011 | Oyagi | G06F 1/1692 715/781 |
| 2011/0248946 A1* | 10/2011 | Michaelis | A61F 4/00 345/174 |
| 2011/0279397 A1* | 11/2011 | Rimon | G06F 3/044 345/173 |
| 2011/0316790 A1* | 12/2011 | Ollila | G06F 3/04883 345/173 |
| 2012/0013607 A1* | 1/2012 | Lee | G06T 15/20 345/419 |
| 2012/0013613 A1* | 1/2012 | Vesely | G06F 3/011 345/419 |
| 2012/0052917 A1* | 3/2012 | Kim | G06F 3/04815 455/566 |
| 2012/0098744 A1* | 4/2012 | Stinson, III | G06F 3/0304 345/158 |
| 2012/0102436 A1* | 4/2012 | Nurmi | G06F 1/1613 715/863 |
| 2012/0113018 A1* | 5/2012 | Yan | G06F 3/04883 345/173 |
| 2012/0113095 A1* | 5/2012 | Hwang | G06F 3/04817 345/419 |
| 2012/0154377 A1* | 6/2012 | Sato | A63F 13/10 345/419 |
| 2012/0249734 A1* | 10/2012 | Takayama | H04N 13/0062 348/43 |
| 2013/0050208 A1* | 2/2013 | Lin | G06T 17/20 345/420 |
| 2013/0147833 A1* | 6/2013 | Aubauer | G06F 3/0416 345/619 |
| 2013/0176236 A1* | 7/2013 | Ivanov | G06F 3/044 345/173 |
| 2013/0311868 A1* | 11/2013 | Monney | G06F 17/30017 715/230 |
| 2014/0129990 A1* | 5/2014 | Xin | G06F 3/017 715/849 |
| 2014/0354786 A1* | 12/2014 | Takahashi | H04N 13/0454 348/51 |

* cited by examiner present a 3-dimensional (3D) scene that includes a plurality of objects via at least one display, including displaying at least one stereoscopic image, where the plurality of objects have spatial or associative relationships, and where the plurality of objects include at least one identified object
702 identify one or more additional objects of the plurality of objects based on the spatial or associative relationships in response to a difference between a current reference frame of a 3D pointing device or an associated 3D cursor and an anchor reference frame, resulting in a plurality of identified objects, where the reference frame of the 3D pointing device or associated 3D cursor and the anchor reference frame are independent of positions of the at least one identified object and the plurality of identified objects
704

Figure 7

OPERATIONS IN A THREE DIMENSIONAL DISPLAY SYSTEM

PRIORITY DATA

This application also claims benefit of priority of U.S. provisional application Ser. No. 61/663,917, titled "Operations in a Three Dimensional Display System", filed Jun. 25, 2012, whose inventors were Jonathan J. Hosenpud and Scott M. Dolim, which is hereby incorporated by reference in its entirety as though fully and completely set forth herein.

FIELD OF THE INVENTION

The present invention relates to the field of three dimensional graphics, and more particularly to pointing device, e.g., stylus, operations in a three dimensional display system.

DESCRIPTION OF THE RELATED ART

Three dimensional (3D) capable computing devices and real-time computer-generated 3D computer graphics have been a popular area of computer science for the past few decades, with innovations in visual, audio, and tactile systems. Much of the research in this area has produced hardware and software products that are specifically designed to generate greater realism and more natural computer-human interfaces. These innovations have significantly enhanced and simplified the user's computing experience.

However, additional tools and improvements to the realm of 3D systems are desired.

SUMMARY OF THE INVENTION

Various embodiments are presented of a system and method for user interaction with objects in a three dimensional (3D) display system, e.g., a stereo imaging system.

A 3-dimensional (3D) stereoscopic scene may be displayed via at least one stereoscopic display device. In other words, the 3D stereoscopic scene may be displayed in a stereoscopic manner on the at least one stereoscopic display device. Note that this is not equivalent to displaying a 3D scene, e.g., a computer generated scene using 3D modeling, in 2D on a 3D television operating in 2D mode.

A 2-dimensional (2D) scene may be displayed via the at least one stereoscopic display device concurrent with display of the 3D stereoscopic scene, where the entire 2D scene is displayed at zero parallax, i.e., in the plane of the display device's screen. In one exemplary embodiment, the 2D scene may be a graphical user interface (GUI) that includes one or more GUI elements. In another exemplary embodiment, the 2D scene may be a background or backdrop for the 3D stereoscopic scene with one or more 2D objects. In other embodiments, the 2D scene may be any type of 2D scene as desired, including combinations of the above.

A current position of a cursor may be determined with respect to the at least one stereoscopic display device based on a position of a 6 degree of freedom (6DOF) 3D pointing device. In other words, the cursor position may be based on the position of a 6DOF 3D pointing device in relation to the at least one stereoscopic display device (e.g., screen), such as a (physical) stylus. For example, the cursor may be an associated 3D cursor corresponding to the tip of the physical stylus. In an alternate embodiment or configuration, the cursor may be positioned at or may correspond to a point offset from the tip. In one embodiment, in being based on the position of the 6DOF 3D pointing device, the current position of the cursor may be based on a virtual beam extending from the position of the 6DOF 3D pointing device. Moreover, the virtual beam may be a configurable length, e.g., the offset from the 6DOF 3D pointing device to the cursor may be adjustable. The distal end of the virtual beam (i.e., the end of the beam furthest from the 6DOF 3D pointing device) may be or include a virtual stylus tip, and the cursor may correspond to the virtual stylus tip.

The cursor may be displayed via the at least one stereoscopic display device concurrent with display of the 3D stereoscopic scene and the 2D scene. The cursor may operate in a 2D mode in response to the current position being inside a specified volume proximate to the at least one stereoscopic display device. Moreover, in the 2D mode, the cursor may be usable to interact with the 2D scene. Similarly, the cursor may operate in a 3D mode in response to the current position being outside the specified volume proximate to the at least one stereoscopic display device, where in the 3D mode, the cursor may be usable to interact with the 3D stereoscopic scene. In some embodiments, in the 2D mode the cursor may be displayed in the 2D scene with a first representation, and in the 3D mode the cursor may be displayed in the 3D stereoscopic scene with a second representation, where the second representation is different from the first representation.

In some embodiments, the 2D scene may be or include a graphical user interface (GUI) that includes one or more 2D user interface (UI) elements. In being usable to interact with the 2D scene, the cursor may be usable to interact with the one or more 2D UI elements. Thus, in an embodiment where the 2D scene is or includes a GUI with one or more 2D GUI elements, in response to the current position being inside the specified volume proximate to the at least one stereoscopic display device, input regarding a displayed 2D (graphical) user interface (UI) element may be received. In other words, if the current position is within a specified volume of space, e.g., adjacent to the display (e.g., screen), pointing device operations (with or of the 6DOF 3D pointing device) may pertain to a 2D GUI element, such as a menu. In one exemplary embodiment, the volume may be specified or bounded by a plane parallel to the display (screen) and the screen, such that if the current position is between the plane and the display, input from the 6DOF 3D pointing device, e.g., stylus (or other pointing device), may be directed to the 2D UI element, e.g., a menu item, i.e., the specified volume may be defined by a plane parallel to a screen of the at least one stereoscopic display device, where the specified volume is on the screen side of the plane.

For example, in one exemplary embodiment the current position may be below such a plane, and thus, within the specified volume proximate (i.e., adjacent or near) to the display (screen). In some embodiments, when the current position is in this specified volume, the cursor may change its appearance to reflect a 2D operational mode. Moreover, in one embodiment, when in the 2D mode, the cursor may "pop" to the 2D surface of the display, and thus may operate like a standard 2D mouse cursor, and may facilitate user interactions with 2D GUI elements or 2D objects displayed in the 2D scene. Said another way, when in 2D mode, the cursor may be displayed as a 2D element on the display, e.g., 2D cursor, rather than a 3D cursor in the space above (or below) the surface of the display. Conversely, when the current position of cursor (whose position may be computed, but not displayed, since the cursor is in 2D mode, and thus displayed on the surface of the display) leaves the specified volume, the cursor may revert to its 3D appearance and position.

In some embodiments, the specified volume may be defined by respective bounding volumes proximate to each of one or more 2D user interface (UI) elements on the at least one stereoscopic display device. Alternatively, in some embodiments, the specified volume may be defined by exclusion of a respective bounding volume of at least one object in the 3D stereoscopic scene. In other words, the specified volume demarcating the 2D and 3D modes of operation may be the volume or space outside the volume or space around one or more 3D objects in the 3D stereoscopic scene, e.g., outside convex hulls associated with each 3D object.

In some embodiments, the 2D UI element(s) may not be displayed unless the 3D pointing device is operating in 2D mode, i.e., the 2D UI may only be displayed when the user positions the 6DOF 3D pointing device or associated cursor within the specified volume. In yet another embodiment, the 2D UI element(s) may displayed in a partial or intermediate manner until the 6DOF 3D pointing device or cursor is operating in 2D mode, i.e., the 2D UI may only be fully displayed when the user positions the 6DOF 3D pointing device or associated cursor within the specified volume. For example, the 2D UI element(s) may be semi-transparent, or "grayed out" until the 2D mode is active. Of course, in various embodiments, any other type of partial or intermediate display techniques may be used as desired.

In one embodiment, rather than distance from the stereoscopic display device, the orientation of the 6DOF 3D pointing device or cursor, e.g., the angle of the positioning of the stylus and/or its cursor beam, may dictate or invoke the change to 2D menu mode. Of course, in other embodiments, any degrees of freedom may be used as desired.

Similarly, as discussed above, the cursor may operate in 3D mode in response to the current position being outside the specified volume, and so in some embodiments, input regarding the 3D scene may be received via the 6DOF 3D pointing device or associated cursor. In some embodiments, the 3D stereoscopic scene may include at least one 3D graphical object, and in being usable to interact with the 3D stereoscopic scene, the cursor may be usable to interact with the at least one 3D graphical object. In other words, if the current position is not in the specified volume (e.g., proximate to the display), the 3D pointing device (e.g., stylus) may operate in a 3D mode, and thus may be used to interact with objects in the 3D scene, e.g., the house.

For example, in one exemplary embodiment, the current position (e.g., of the stylus or its associated 3D cursor) may be above the plane and thus may operate in 3D mode, e.g., allowing user interaction with respect to the house. Note that in this embodiment, the cursor may revert to its 3D representation, e.g., 3D cursor.

As discussed above, in some embodiments, the (3D) cursor may be positioned at or near the tip of the 6DOF 3D pointing device. However, in some embodiments, the 3D pointing device may be capable of extending the 3D cursor in a specified direction, e.g., in the form of a ray or beam of configurable length, e.g., in one exemplary embodiment the cursor may be shown extended from the tip of the stylus, e.g., may be a 3D extended cursor. Thus, it may be the case that the stylus tip (e.g., position of the 3D pointing device) may be outside the specified volume (e.g., above the plane) while the 3D cursor may be positioned within the specified volume (e.g., below the plane). Accordingly, in some embodiments, the particular position used may be configurable, or may default to either. For example, in one embodiment, the current position may always be that of the 3D cursor associated with the 3D pointing device.

It should be noted that in some embodiments, the specified volume may have different shapes or arrangements. For example, as noted above, in some embodiments, the volume may be defined by one or more bounding volumes, e.g., rectangular solids, spheres, convex hulls, etc., containing respective objects of the 3D scene, where the specified volume proximate to the display may be the space excluded by these volumes. In other words, the specified volume proximate to the display may be defined by not being a volume specified for 3D mode. Said another way, in some embodiments, the "2D mode" volume may be defined by defining the "3D mode" volume, where the "2D mode" volume does not include the "3D mode" volume. In other embodiments, the specified volume may include respective volumes defined around (or above) 2D UI elements, such that if the current position is within any of these volumes, the 2D mode is operational. In one embodiment, the specified volume and the space outside the specified volume may define respective regions, where one region is displayed as inactive when the cursor is in the other region.

Thus, in various embodiments, the cursor (and/or the 6DOF 3D pointing device), or more generally, the 3D presentation system, may operate in different modes, e.g., 2D vs. 3D, based on proximity of the cursor to the at least one stereoscopic display device, or more generally, based on positioning the 3D pointing device or its associated 3D cursor within a specified volume (or alternatively, outside another specified volume).

BRIEF DESCRIPTION OF THE DRAWINGS

A better understanding of the present invention can be obtained when the following detailed description of the preferred embodiment is considered in conjunction with the following drawings, in which:

FIG. 7 is a flowchart diagram illustrating one embodiment of a method for identifying objects in a 3D scene, according to some embodiments.

Figure 1:
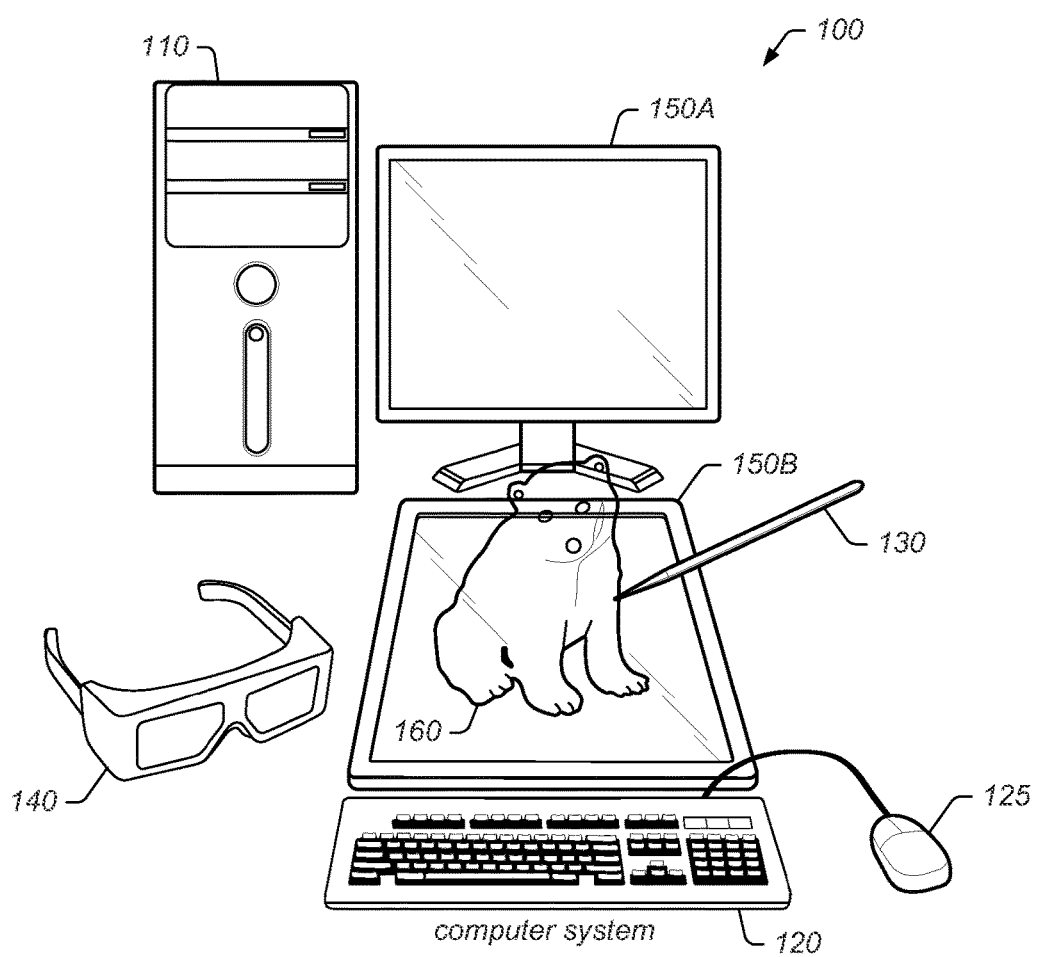
FIGS. 1 and 2 illustrate exemplary systems configured to implement various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. provisional application Ser. No. 61/663,917, titled "Operations in a Three Dimensional Display System", filed Jun. 25, 2012, filed Jun. 25, 2012.

U.S. provisional application Ser. No. 61/361,081 titled "User Interface Elements for use within a Three Dimensional Scene" filed Jul. 2, 2010.

U.S. application Ser. No. 13/174,448, titled "User Interface Elements for use within a Three Dimensional Scene" filed Jun. 30, 2011.

U.S. provisional application Ser. No. 61/364,277, titled "Tools for use within a Three Dimensional Scene", filed Jul. 14, 2010.

U.S. application Ser. No. 13/182,305, titled "Tools for use within a Three Dimensional Scene" filed Jul. 13, 2011.

U.S. provisional application Ser. No. 61/561,733, titled "Pre Button Event Stylus Position", filed Nov. 18, 2011.

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 12/797,958, titled "Presenting a View within a Three Dimensional Scene", filed on Jun. 10, 2010, whose inventors are Michael A. Vesely and Alan S. Gray.

U.S. patent application Ser. No. 13/019,384, titled "Modifying Perspective of Stereoscopic Images Based on Changes in User Viewpoint", filed on Feb. 2, 2011, whose inventors are Michael A. Vesely, Nancy L. Clemens, and Alan S. Gray.

Terms

The following is a glossary of terms used in the present application:

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—this term has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below). The term "virtual viewpoint" refers to a viewpoint from within a virtual representation or 3D scene.

Eyepoint—the physical of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene (e.g., which sustains a normalized perspective of the user to the normalized display surface). A vertical perspective may be a central perspective, e.g., having a central vanishing point. In a vertical perspective, the viewpoint may have a line of site parallel to the ground plane (e.g., floor) and towards a display surface that is perpendicular to the ground plane. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints. The term "perpendicular perspective" may also refer to the definition above.

Horizontal Perspective—a perspective which is rendered from a viewpoint which is not perpendicular to the display surface. More particularly, the term "horizontal perspective" refers to a perspective which is rendered using a substantially 45 degree angled render plane in reference to the corresponding viewpoint. The rendering may be intended for a display which may be positioned horizontally (e.g., parallel to a ground plane, e.g. table or floor) in reference to a standing viewpoint perspective. "Substantially 45 degrees" may refer to 45 degrees or variations thereof, such as 44 and 46 degrees, 40-50 degrees, or any variation which may cause minimal distortion of the rendered scene (e.g., which sustains the appropriate angled projection of the image within the rendered scene). In a horizontal perspective, a display surface may be parallel to the ground plane, but may be some angle off parallel to the ground plane in either the horizontal or vertical direction. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints. The term "oblique perspective" may also refer to the definition above.

Automatically—refers to an action or operation performed by a computer system (e.g., software executed by the computer system), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Zero Parallax—refers to a display plane coincident with a screen of a display device. For example, a 2D scene is displayed at zero parallax. In other words, zero parallax refers to a virtual plane that represents the display screen.

Figure 2:
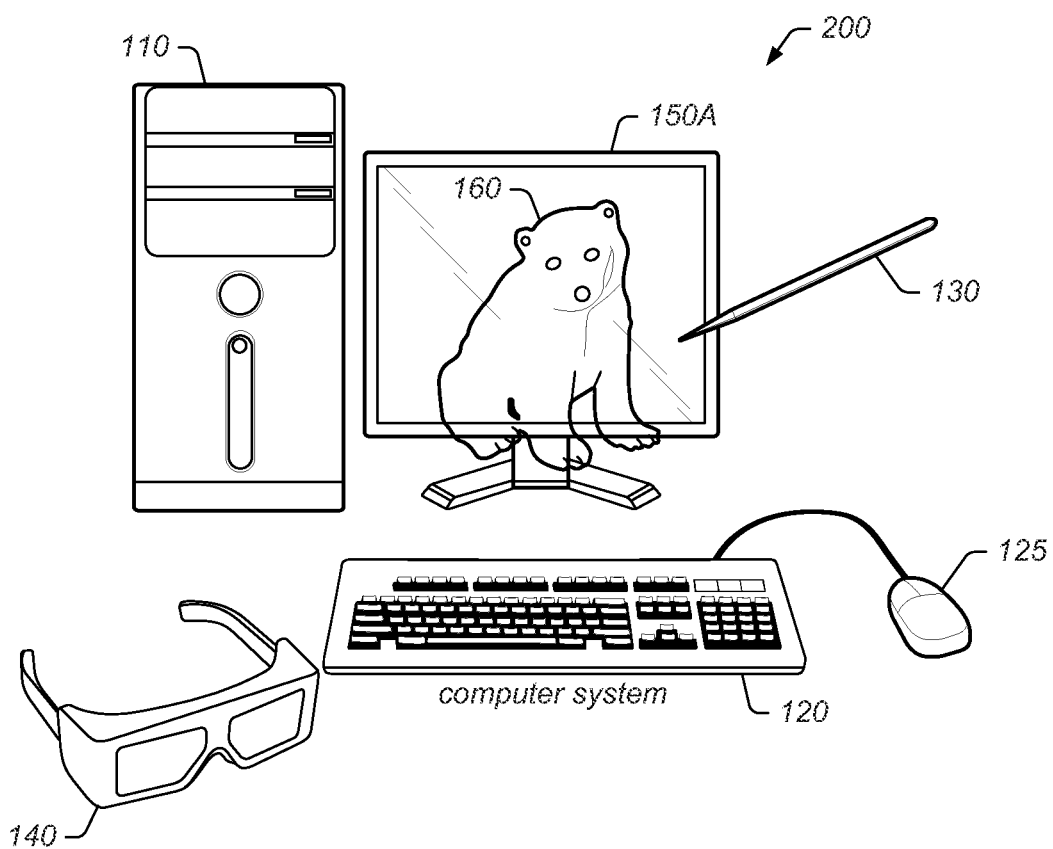

FIGS. 1 and 2—Exemplary Systems

FIGS. 1 and 2 illustrate exemplary systems which are configured to perform various embodiments described below.

In the embodiment of FIG. 1, computer system 100 may include chassis 110, display 150A and display 150B (which may collectively be referred to as display 150 or "at least one display" 150), keyboard 120, mouse 125, a 3D pointing device 130, in this exemplary case, a stylus, and glasses 140. In one embodiment, at least one of the displays 150A and 150B is a stereoscopic display. For example, in one embodiment, both of the displays 150A and 150B are stereoscopic displays. The displays 150A and 150B may be closely positioned to each other, e.g., where they abut. The angle formed between the displays may be any of various angles, e.g., 90 degrees, 110 degrees, etc.

It should be noted that as used herein, a "3D pointing device" may be any type of pointing device or manipulator capable of indicating at least a position in 3-space, e.g., x, y, and z, i.e., having at least 3 degrees of freedom (DOFs), and in preferred embodiments, has 4 or more DOFs, e.g., 6 DOF, such as position and orientation with respect to 3 spatial axes or dimensions, e.g., x, y, z, (for position) and pitch, roll, and yaw (for orientation). In other embodiments, the 3D pointing device may have any combinations of 4 or more DOFs, as desired.

The chassis 110 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform the methods described herein. The memory medium may also store data (e.g., a computer model) representing a virtual space, which may be used for projecting a 3D scene of the virtual space via the display(s) 150. The memory medium may further store software for presenting the various user interface elements described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images) using the display 150A and/or the display 150B. The computer system 100 may also be configured to display or present user interface elements, e.g., within the 3D scene, and/or independently of the 3D scene, e.g., 2D menus, controls, etc., e.g., behind, under, or to the side of the 3D scene, using the display 150A, the display 150B, and/or another display, as described in more detail below.

It should be noted that the embodiment of FIG. 1 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided in more detail below. Additionally, while the displays 150 are shown as flat panel displays, they may be any type of system which is capable of displaying images, e.g., projection systems.

Either or both of the displays 150A and 150B may present (display) stereoscopic images for viewing by the user, i.e., objects in a 3D scene imaged in stereo. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear the glasses 140 (although using some displays, glasses may not be necessary). The glasses 140 may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shuttering glasses, each lens is synchronized to alternations of left and right eye images provided by the display(s) 150. The display may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cyclindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, the glasses 140 may be used as a position input device to track the eyepoint of a user viewing a 3D scene presented by the system 100. For example, the glasses 140 may provide information that is usable to determine the position of the eyepoint(s) of the user, e.g., via triangulation. The position input device can include an infrared detection system to detect the position the viewer's head to allow the viewer freedom of head movement or use a light sensitive detection system. Other embodiments of the input device can be the triangulation method of detecting the viewer eyepoint location, such as a camera (e.g., a CCD camera) providing position data suitable for the head tracking objectives of the invention. The input device can be manually operated by the viewer, such as a keyboard, mouse, trackball, joystick, or the like, to indicate the correct display of the horizontal perspective display images. However, any method for tracking the position of the user's head or eyepoint is envisioned. Accordingly, the 3D scene may be rendered such that user can view the 3D scene with appropriately modified projection skewing (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual space to the physical space of the system 100. In essence, the physical space and components used are to be mapped to the virtual model in order to accurately render a 3D scene of the virtual space. Examples for implementing such a system are described in the incorporated-by-reference U.S. patent application Ser. No. 11/098,681 entitled "Horizontal Perspective Display" (U.S. Patent Publication No. US 2005/0219694).

One or more of the user input devices (e.g., the keyboard 120, the mouse 125, the stylus 130, etc.) may be used to interact with the presented 3D scene. For example, the user input device 130 (shown as a stylus), e.g., a 3D pointing device, or simply the user's hands may be used to interact with virtual objects of the 3D scene (via the viewed projected objects). However, this "direct" interaction may lend itself more easily to "open space" portions of the 3D scene. Thus, at least a portion of the 3D scene may be presented in this "open space", which is in front of or otherwise outside of (e.g., behind) the at least one display. Thus, at least a portion of the 3D scene may appear as a hologram above the surface of the display 150. For example, when the horizontal display 150B is used, the 3D scene may be seen as hovering above the horizontal display, as illustrated by the young polar bear image of FIG. 1. It should be noted however, that a portion of the 3D scene may also be presented as appearing below the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). Note that it is possible to have open space behind the display surface, e.g., where the user is able to put his hands behind the display surface and freely move around. Such embodiments may be particularly applicable for see-through displays. This "open space" may be referred to as a "hands-on volume" as opposed to an "inner volume" or "inner space", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools. That is, they may be manipulated indirectly, e.g., via a computer mouse or a joystick, or via a 3D pointing device operating in an appropriate mode.

In some embodiments, this open space interaction may be achieved by having a 1:1 correspondence between the virtual objects (e.g., in the virtual space) and projected objects (e.g., in the physical space). Thus, an accurate and tangible physical interaction is provided by allowing a user to touch and manipulate projected objects with his hands or hand held tools, such as the stylus 130. This 1:1 correspondence of the virtual elements and their physical real-world equivalents is described in more detail in U.S. Patent Publication No. 2005/0264858, which was incorporated by reference in its entirety above. This 1:1 correspondence is a new computing concept that may allow the user to directly access and interact with projected objects of the 3D scene. This new concept requires the creation of a common physical reference plane, as well as the formula for deriving its unique x, y, z spatial coordinates, thereby correlating the physical coordinate environment to the virtual coordinate environment. Additionally, the 1:1 correspondence allows the user's movement of virtual objects or other interaction (e.g., via the stylus 130) to be the same in physical space and in presented space. However, other embodiments are envisioned where there is a ratio between the distance of the user's physical movement and the corresponding movement in the presented 3D scene (e.g., of the presented object or virtual stylus).

As described below, the user may be able to interact with the 3D scene using various user interface (UI) elements, which may be displayed within the 3D scene, or in a 2D presentation that is not part of the 3D scene.

The 3D scene generator stored and executed in the chassis 110 may be configured to dynamically change the displayed images provided by the display(s) 150. More particularly, the 3D scene generator may update the displayed 3D scene based on changes in the user's eyepoint, manipulations via the user input devices, etc. Such changes may be performed dynamically, at run-time. The 3D scene generator may also keep track of peripheral devices (e.g., the stylus 130 or the glasses 140) to ensure synchronization between the peripheral device and the displayed image. The system can further include a calibration unit to ensure the proper mapping of the peripheral device to the display images and proper mapping between the projected images and the virtual images stored in the memory of the chassis 110.

In further embodiments, the system 100 (e.g., the display(s) 150) can further comprise an image enlargement/reduction input device, an image rotation input device, and/or an image movement device to allow the viewer to adjust the view of the projection images.

Thus, the system 100 may present a 3D scene which the user can interact with (e.g., using UI elements or tools) in real time. The system may comprise real time electronic display(s) 150 that can present or convey perspective images in the open space and a peripheral device 130 that may allow the user to interact with the 3D scene with hand controlled or hand-held tools, e.g., 2D or 3D pointing devices. The system 100 may also include means to manipulate the displayed image such as magnification, zoom, rotation, movement, and even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 illustrates another embodiment of the system 100, shown as system 200. In this embodiment, the system includes similar components as the system of FIG. 1, but in this exemplary embodiment utilizes a single 3D display. Below are described various novel techniques and mechanisms for user interaction with such 3D display systems.

Exemplary Applications

Embodiments of the present invention may augment the current state of real-time computer-generated 3D computer graphics and tactile computer-human interfaces with real time interaction. More specifically, these new embodiments may enable real-time computer-generated 3D simulations to coexist in physical space and time with the user interacting with the projected objects. This unique ability may be useful in many industries including, but not limited to, electronics, computers, biometrics, medical, education, games, movies, science, legal, financial, communication, law enforcement, national security, military, print media, television, advertising, trade show, data visualization, computer-generated reality, animation, CAD/CAE/CAM, productivity software, operating systems, and more.

Figure 3A:
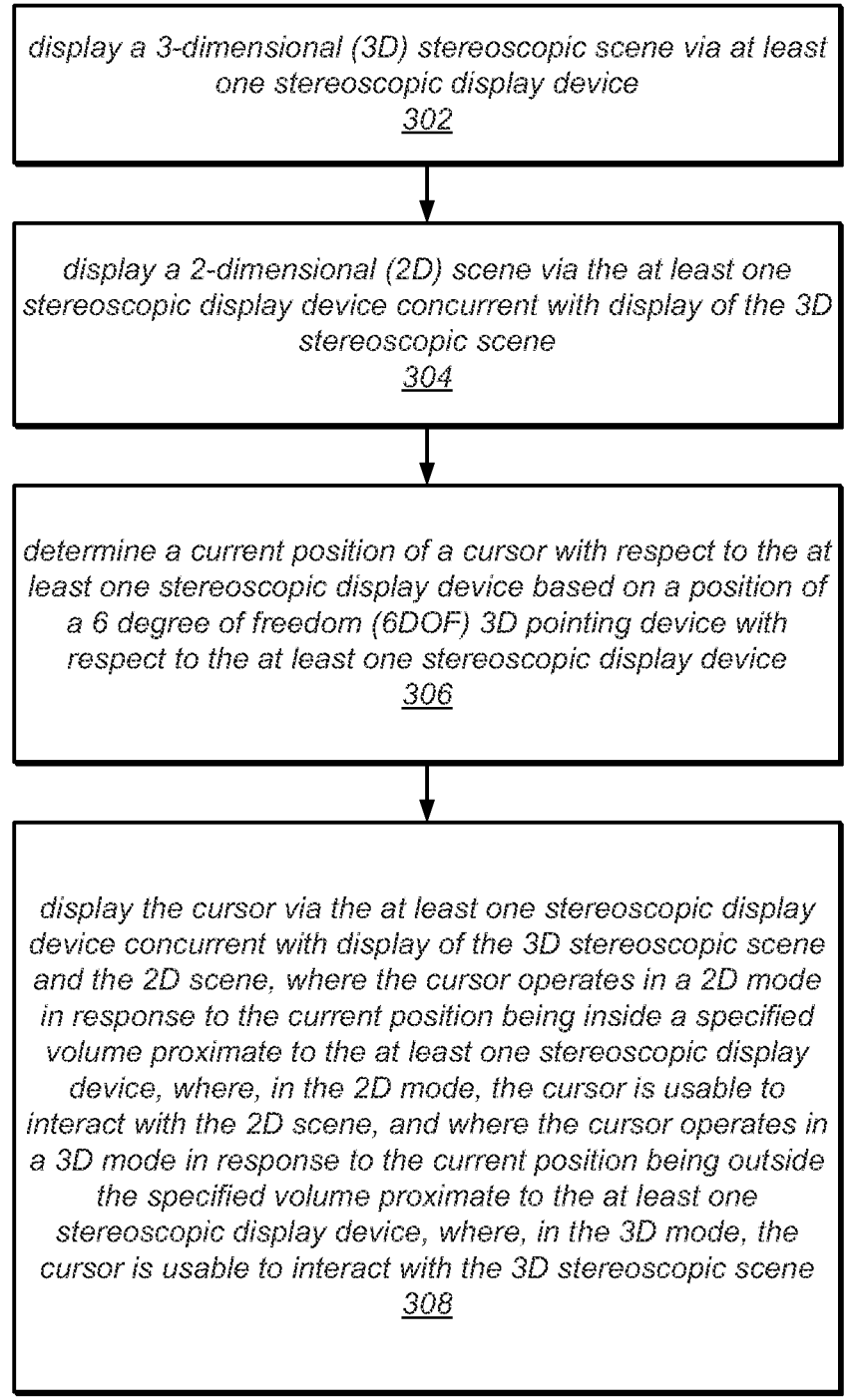
FIGS. 3A and 3B are flowcharts of a method for invoking 2D and 3D operational modes in a 3D presentation system based on proximity to a display, according to some embodiments.

FIG. 3A—Method of Invoking 3D Pointing Device Operational Modes Based on Proximity to Display FIG. 3A is a flowchart of an exemplary method for invoking 2D and 3D operational modes of a 3D pointing device in a 3D presentation system based on proximity to a display, e.g., a screen of a display device, according to one embodiment. The method shown in FIG. 3A may be used in conjunction with any of the systems or devices described herein. In various embodiments, some of the method elements shown may be performed concurrently, in a different order than shown, or may be omitted. Additional method elements may also be performed as desired. As shown, the method may operate as follows.

Figure 4A:
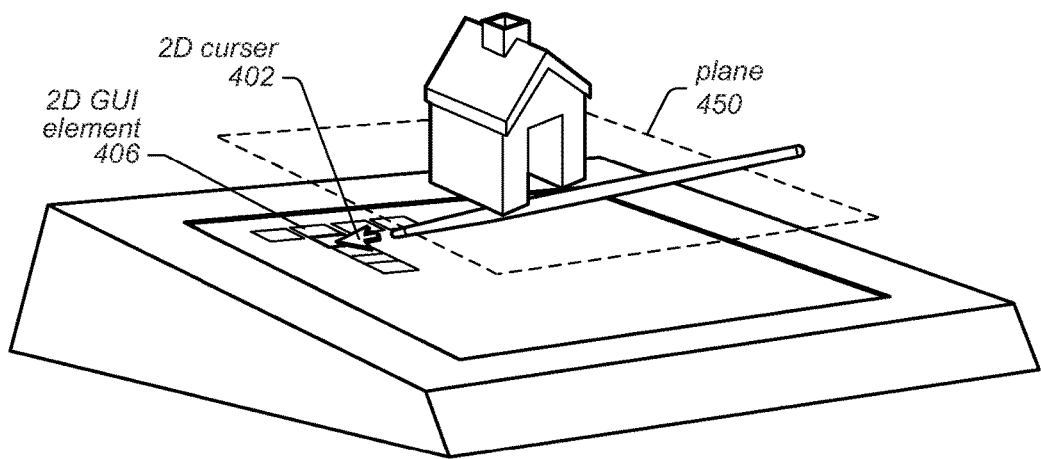
FIGS. 4A-4C illustrate exemplary operations modes of a 3D pointing device per the method of FIGS. 3A and 3B, according to some embodiments.

In 302, a 3-dimensional (3D) stereoscopic scene may be displayed via at least one stereoscopic display device. A simple exemplary 3D stereoscopic scene is shown in FIG. 4A (as well as FIGS. 1, 2, and others), specifically, a small house displayed on a horizontal display device 150B. In other words, the 3D stereoscopic scene may be displayed in a stereoscopic manner on the at least one stereoscopic display device. Note that this is not equivalent to displaying a 3D scene, e.g., a computer generated scene using 3D modeling, in 2D on a 3D television operating in 2D mode.

In 304, a 2-dimensional (2D) scene may be displayed via the at least one stereoscopic display device concurrent with display of the 3D stereoscopic scene, where the entire 2D scene is displayed at zero parallax, i.e., in the plane of the display device's screen. The 2-dimensional (2D) scene may be on a single plane and that plane may be at zero parallax. In one exemplary embodiment, the 2D scene may be a graphical user interface (GUI) that includes one or more GUI elements, as discussed in detail below with reference to the method of FIG. 3B. In another exemplary embodiment, the 2D scene may be a background or backdrop for the 3D stereoscopic scene with one or more 2D objects. In other embodiments, the 2D scene may be any type of 2D scene as desired, including combinations of the above. Note that the 2D scene is not necessarily in or of the (or a) 3D stereoscopic scene. For example, in an embodiment where the 2D (stereoscopic) scene is the operating system (OS) GUI, e.g., "desktop", the OS desktop is not within a 3D stereoscopic scene. If simultaneously, there is a stereo 3D application (presenting a 3D stereoscopic scene) taking up part of the desktop, then both the stereo 3D scene (from the application) and the normal 2D OS desktop (2D scene) are displayed via the stereoscopic display device(s).

In 306, a current position of a cursor may be determined with respect to the at least one stereoscopic display device based on a position of a 6 degree of freedom (6DOF) 3D pointing device. In other words, the cursor position may be based on the position of a 6DOF 3D pointing device in relation to the at least one stereoscopic display device (e.g., screen), such as the (physical) stylus 130 shown in FIGS. 1 and 2. For example, the cursor may be an associated 3D cursor corresponding to the tip of the physical stylus 130. In an alternate embodiment or configuration, the cursor may be positioned at or may correspond to a point offset from the tip. In one embodiment, in being based on the position of the 6DOF 3D pointing device, the current position of the cursor may be based on a virtual beam extending from the position of the 6DOF 3D pointing device. Moreover, the virtual beam may be a configurable length, e.g., the offset from the 6DOF 3D pointing device to the cursor may be adjustable. The distal end of the virtual beam (i.e., the end of the beam furthest from the 6DOF 3D pointing device) may be or include a virtual stylus tip, and the cursor may correspond to the virtual stylus tip.

In 308, the cursor may be displayed via the at least one stereoscopic display device concurrent with display of the 3D stereoscopic scene and the 2D scene. The cursor may operate in a 2D mode in response to the current position being inside a specified volume proximate to the at least one stereoscopic display device. Moreover, in the 2D mode, the cursor may be usable to interact with the 2D scene, which may be at zero parallax. Similarly, the cursor may operate in a 3D mode in response to the current position being outside the specified volume proximate to the at least one stereoscopic display device, where in the 3D mode, the cursor may be usable to interact with the 3D stereoscopic scene in either zero, positive, or negative parallax. In some embodiments, in the 2D mode the cursor may be displayed in the 2D scene with a first representation, and in the 3D mode the cursor may be displayed in the 3D stereoscopic scene with a second representation, where the second representation is different from the first representation.

In some embodiments, the 2D scene may be or include a graphical user interface (GUI) that includes one or more 2D user interface (UI) elements. In being usable to interact with the 2D scene, the cursor may be usable to interact with the one or more 2D UI elements. Thus, in an embodiment where the 2D scene is or includes a GUI with one or more 2D GUI elements, in response to the current position being inside the specified volume proximate to the at least one stereoscopic display device, input regarding a displayed 2D (graphical) user interface (UI) element may be received. In other words, if the current position is within a specified volume of space, e.g., adjacent to the display (e.g., screen), pointing device operations (with or of the 6DOF 3D pointing device) may pertain to a 2D GUI element, such as a menu. In one exemplary embodiment, illustrated in FIG. 4A, the volume may be specified or bounded by a plane 450 parallel to the display (screen) and the screen, such that if the current position is between the plane and the display, input from the 6DOF 3D pointing device, e.g., stylus 130 (or other pointing device), may be directed to the 2D UI element, e.g., menu item 406, i.e., the specified volume may be defined by a plane parallel to a screen of the at least one stereoscopic display device, where the specified volume is on the screen side of the plane.

As FIG. 4A shows, in this exemplary embodiment the current position is below such a plane, and thus, is within the specified volume proximate (i.e., adjacent or near) to the display (screen). In some embodiments, when the current position is in this specified volume, the cursor may change its appearance to reflect a 2D operational mode, as FIG. 4A indicates. Moreover, in one embodiment, when in the 2D mode, the cursor may "pop" to the 2D surface of the display (zero parallax), and thus may operate like a standard 2D mouse cursor, and may facilitate user interactions with 2D GUI elements or 2D objects displayed in the 2D scene. The cursor itself may change appearance to resemble one of many 2D cursor appearances. Said another way, when in 2D mode, the cursor may be displayed as a 2D element on the display, e.g., 2D cursor 402, rather than a 3D cursor in the space in front of the surface of the display (or "above", i.e., negative parallax), or behind the surface of the display (or "into" or "below", i.e., positive parallax). Conversely, when the current position of cursor (whose position may be computed, but not displayed, since the cursor is in 2D mode, and thus displayed on the surface of the display) leaves the specified volume, the cursor may revert to its 3D appearance and position.

In some embodiments, the specified volume may be defined by respective bounding volumes proximate to each of one or more 2D user interface (UI) elements on the at least one stereoscopic display device. Alternatively, in some embodiments, the specified volume may be defined by exclusion of a respective bounding volume of at least one object in the 3D stereoscopic scene. In other words, the specified volume demarcating the 2D and 3D modes of operation may be the volume or space outside the volume or space around one or more 3D objects in the 3D stereoscopic scene, e.g., outside convex hulls associated with each 3D object.

In some embodiments, the 2D UI element(s) may not be displayed unless the 3D pointing device is operating in 2D mode, i.e., the 2D UI may only be displayed when the user positions the 6DOF 3D pointing device or associated cursor within the specified volume. In yet another embodiment, the 2D UI element(s) may displayed in a partial or intermediate manner until the 6DOF 3D pointing device or cursor is operating in 2D mode, i.e., the 2D UI may only be fully displayed when the user positions the 6DOF 3D pointing device or associated cursor within the specified volume. For example, the 2D UI element(s) may be semi-transparent, or "grayed out" until the 2D mode is active. Of course, in various embodiments, any other type of partial or intermediate display techniques may be used as desired.

In one embodiment, rather than distance from the stereoscopic display device, the orientation of the 6DOF 3D pointing device or cursor, e.g., the angle of the positioning of the stylus and/or its cursor beam, may dictate or invoke the change to 2D menu mode. Of course, in other embodiments, any degrees of freedom may be used as desired.

Similarly, as discussed above, the cursor may operate in 3D mode in response to the current position being outside the specified volume, and so in some embodiments, input regarding the 3D scene may be received via the 6DOF 3D pointing device or associated cursor. In some embodiments, the 3D stereoscopic scene may include at least one 3D graphical object, and in being usable to interact with the 3D stereoscopic scene, the cursor may be usable to interact with the at least one 3D graphical object. In other words, if the current position is not in the specified volume (e.g., proximate to the display), the 3D pointing device (e.g., stylus) may operate in a 3D mode, and thus may be used to interact with objects in the 3D scene, e.g., the house.

Figure 4B:
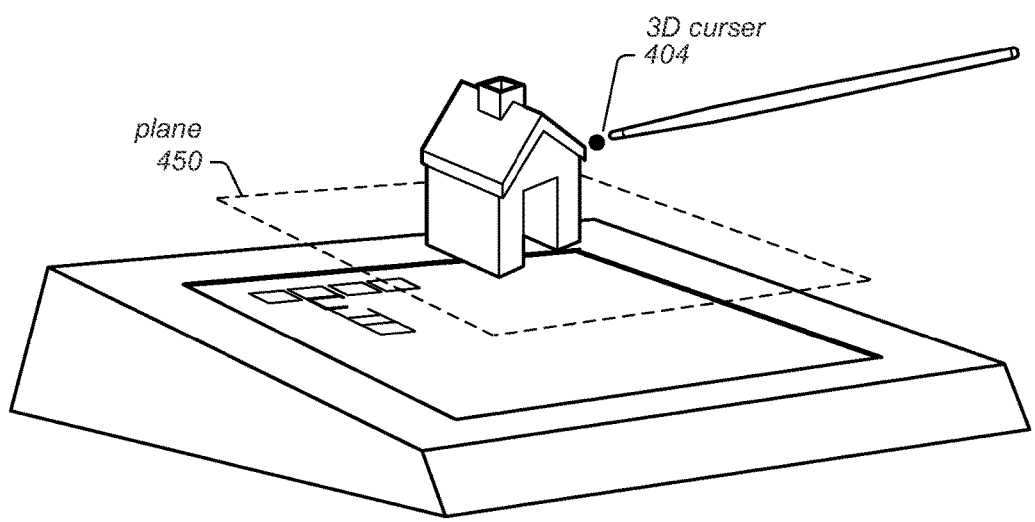

FIG. 4B illustrates this feature following the example of FIG. 4A. As may be seen, in this exemplary embodiment, the current position (of the stylus 130 or its associated 3D cursor) is above the plane 450 and thus may operate in 3D mode, e.g., allowing user interaction with respect to the house. Note that in this embodiment, the cursor has reverted to its 3D representation, e.g., 3D cursor 404.

Figure 4C:
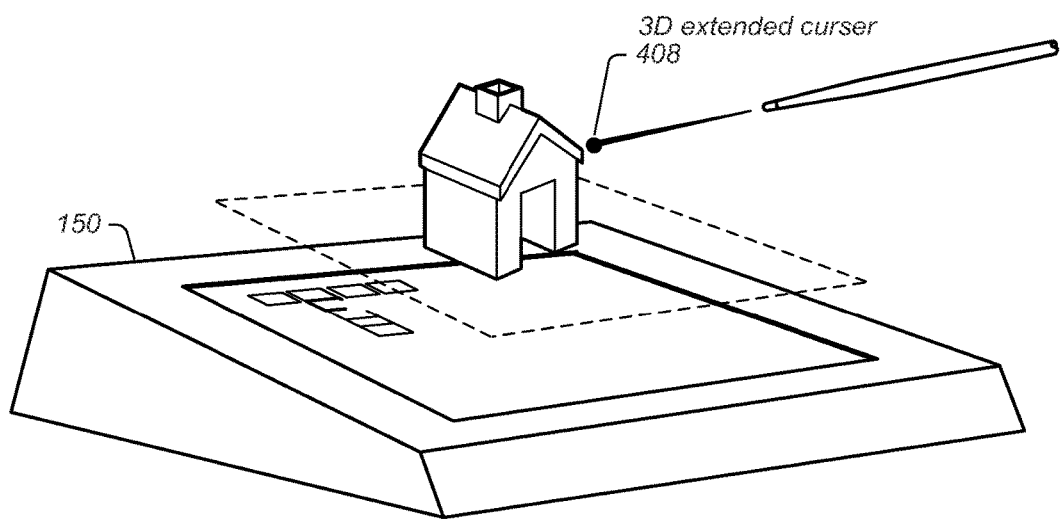

As discussed above, in some embodiments, the (3D) cursor may be positioned at or near the tip of the 6DOF 3D pointing device, as illustrated in FIG. 4B. However, in some embodiments, the 3D pointing device may be capable of extending the 3D cursor in a specified direction, e.g., in the form of a ray or beam of configurable length. FIG. 4C illustrates an exemplary embodiment where the cursor is shown extended from the tip of the stylus 130, e.g., 3D extended cursor 408. Thus, it may be the case that the stylus tip (e.g., position of the 3D pointing device) may be outside the specified volume (e.g., above the plane) while the 3D cursor may be positioned within the specified volume (e.g., below the plane). Accordingly, in some embodiments, the particular position used may be configurable, or may default to either. For example, in one embodiment, the current position may always be that of the 3D cursor associated with the 3D pointing device.

It should be noted that in some embodiments, the specified volume may have different shapes or arrangements. For example, as noted above, in some embodiments, the volume may be defined by one or more bounding volumes, e.g., rectangular solids, spheres, convex hulls, etc., containing respective objects of the 3D scene, where the specified volume proximate to the display may be the space excluded by these volumes. In other words, the specified volume proximate to the display may be defined by not being a volume specified for 3D mode. Said another way, in some embodiments, the "2D mode" volume may be defined by defining the "3D mode" volume, where the "2D mode" volume does not include the "3D mode" volume. In other embodiments, the specified volume may include respective volumes defined around (or above) 2D UI elements, such that if the current position is within any of these volumes, the 2D mode is operational. In one embodiment, the specified volume and the space outside the specified volume may define respective regions, where one region is displayed as inactive when the cursor is in the other region.

In some embodiments, the method may repeat the above method elements one or more times in an iterative manner.

Thus, in various embodiments, the cursor (and/or the 6DOF 3D pointing device), or more generally, the 3D presentation system, may operate in different modes, e.g., 2D vs. 3D, based on proximity of the cursor to the at least one stereoscopic display device, or more generally, based on positioning the 3D pointing device or its associated 3D cursor within a specified volume (or alternatively, outside another specified volume).

Figure 3B:
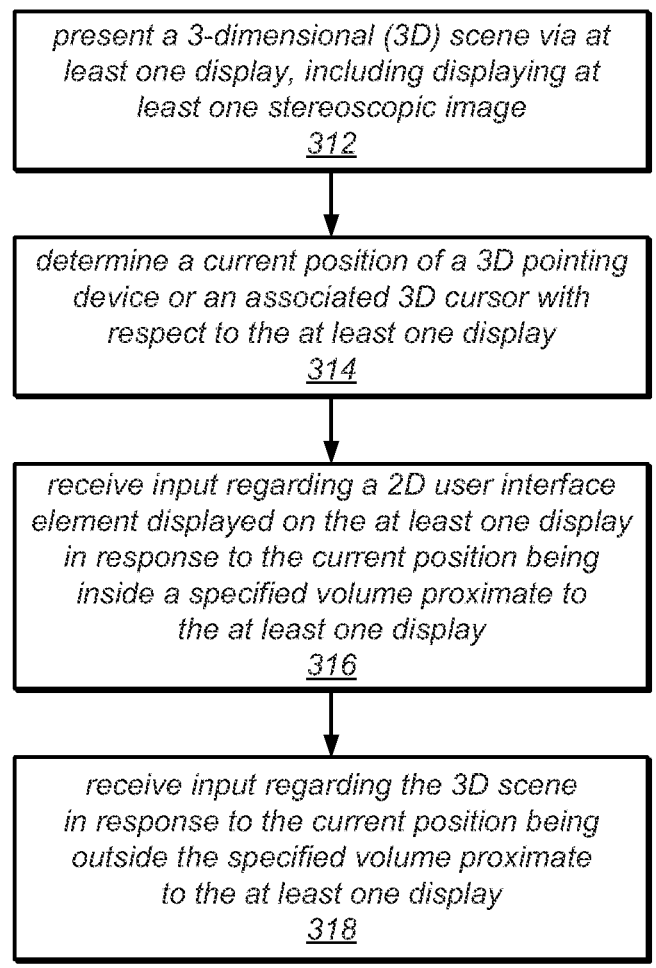

FIG. 3B—Method of Invoking 3D Pointing Device Operational Modes Based on Proximity to Display FIG. 3B is a flowchart of an exemplary method for invoking 2D and 3D operational modes of a 3D pointing device in a 3D presentation system based on proximity to a display, e.g., a screen of a display device, according to further embodiments. More specifically, the method of FIG. 3B is a variant of the more general method of FIG. 3A. The method shown in FIG. 3B may be used in conjunction with any of the systems or devices described herein. In various embodiments, some of the method elements shown may be performed concurrently, in a different order than shown, or may be omitted. Additional method elements may also be performed as desired. For the reader's convenience, some of the features described above with respect to embodiments of the method of FIG. 3A that also apply to embodiments of the method of FIG. 3B are re-presented in the below description of FIG. 3B. As shown, the method may operate as follows.

In 312, a 3-dimensional (3D) scene may be presented via at least one display, including displaying at least one stereoscopic image. A simple exemplary 3D scene is shown in FIG. 4A (as well FIGS. 1, 2, and others), specifically, a small house displayed on a horizontal display device 150B.

In 314, a current position of a 3D pointing device or an associated 3D cursor with respect to the at least one display may be determined. In other words, the method may determine the current position of a 3D pointing device, such as the stylus 130 shown, or its associated 3D cursor, in relation to the display.

In 316, in response to the current position being inside a specified volume proximate to the at least one display, input regarding a 2D (graphical) user interface (UI) element displayed on the at least one display may be received. In other words, if the current position is within a specified volume of space, e.g., adjacent to the display (e.g., screen), pointing device operations may pertain to a 2D GUI element, such as a menu. In one exemplary embodiment, illustrated in FIG. 4A, the volume may be specified or bounded by a plane 450 parallel to the display (screen) and the screen, such that if the current position is between the plane and the display, input from the stylus (or other pointing device) may be directed to the 2D UI element, e.g., menu item 406. In other words, as FIG. 4A shows, in this exemplary embodiment the current position is below such a plane, and thus, is within the specified volume proximate (i.e., adjacent or near) to the display. In some embodiments, when the current position is in this specified volume, the cursor may change its appearance to reflect a 2D operational mode, as FIG. 4A indicates. Moreover, in one embodiment, when in this 2D mode, the cursor may "pop" to the 2D surface of the display, and thus may operate like a standard 2D mouse cursor. Said another way, when in 2D mode, the cursor may be displayed as a 2D element on the display, e.g., 2D cursor 402, rather than a 3D cursor in the space above (or below) the surface of the display. Conversely, when the current position of the 3D pointing device or the associated 3D cursor (whose position may be computed, but not displayed, since the cursor is in 2D mode, and thus displayed on the surface of the display) leaves the specified volume, the cursor may revert to its 3D appearance and position.

In some embodiments, the 2D UI element(s) may not be displayed unless the 3D pointing device is operating in "2D mode", i.e., the 2D UI may only be displayed when the user positions the 3D pointing device or associated cursor within the specified volume. In yet another embodiment, the 2D UI element(s) may displayed in a partial or intermediate manner until the 3D pointing device is operating in "2D mode", i.e., the 2D UI may only be fully displayed when the user positions the 3D pointing device or associated cursor within the specified volume. For example, the 2D UI element(s) may be semi-transparent, or "grayed out" until the 2D mode is active. Of course, in various embodiments, any other type of partial or intermediate display techniques as desired.

In one embodiment, rather than distance from the display, the orientation of the 3D pointing device or cursor, e.g., the angle of the positioning of the stylus and/or its cursor beam, may dictate or invoke the change to 2D menu mode. Of course, in other embodiments, any degrees of freedom may be used as desired.

In 318, in response to the current position being outside the specified volume proximate to the at least one display, input regarding the 3D scene may be received. In other words, if the current position is not in the specified volume proximate to the display, the 3D pointing device (e.g., stylus) may operate in a 3D mode, and thus may be used to interact with objects in the 3D scene, e.g., the house.

FIG. 4B illustrates this feature following the example of FIG. 4A. As may be seen, in this exemplary embodiment, the current position (of the stylus 130 or its associated 3D cursor) is above the plane 450 and thus may operate in 3D mode, e.g., allowing user interaction with respect to the house. Note that in this embodiment, the cursor has reverted to its 3D representation, e.g., 3D cursor 404.

In some embodiments, the 3D cursor may be positioned at or near the tip of the 3D pointing device, as illustrated in FIG. 4B. However, in some embodiments, the 3D pointing device may be capable of extending the 3D cursor in a specified direction, e.g., in the form of a ray or beam of configurable length. FIG. 4C illustrates an exemplary embodiment where the cursor is shown extended from the tip of the stylus 130, e.g., 3D extended cursor 408. Thus, it may be the case that the stylus tip (e.g., position of the 3D pointing device) may be outside the specified volume (e.g., above the plane) while the 3D cursor may be positioned within the specified volume (e.g., below the plane). Accordingly, in some embodiments, the particular position used may be configurable, or may default to either. For example, in one embodiment, the current position may always be that of the 3D cursor associated with the 3D pointing device.

It should be noted that in some embodiments, the specified volume may have different shapes or arrangements. For example, in some embodiments, the volume may be defined by one or more bounding volumes, e.g., rectangular solids, spheres, convex hulls, etc., containing respective objects of the 3D scene, where the specified volume proximate to the display may be the space excluded by these volumes. In other words, the specified volume proximate to the display may be defined by not being a volume specified for 3D mode. Said another way, in some embodiments, the "2D mode" volume may be defined by defining the "3D mode" volume, where the "2D mode" volume does not include the "3D mode" volume. In other embodiments, the specified volume may include respective volumes defined around (or above) 2D UI elements, such that if the current position is within any of these volumes, the 2D mode is operational.

In some embodiments, the method may repeat the above method elements one or more times in an iterative manner.

Thus, in various embodiments, the 3D pointing device, or more generally, the 3D presentation system, may operate in different modes, e.g., 2D vs. 3D, based on proximity of the 3D pointing device or its associated 3D cursor to the display, or more generally, based on positioning the 3D pointing device or its associated 3D cursor within a specified volume (or alternatively, outside another specified volume).

It should be noted that any of the features and details described above with respect to the method of FIG. 3A may also be incorporated in embodiments of the method of FIG. 3B.

Further Exemplary Embodiments

The following describes further exemplary embodiments.

In one embodiment, a 3-dimensional (3D) scene may be presented by at least one display. Presenting the 3D scene may include displaying at least one stereoscopic image of the 3D scene by the at least one display, where the 3D scene is presented according to a first viewpoint with respect to the at least one display, and where the 3D scene correlates to a physical open space. The first viewpoint may have a first viewpoint X, Y, and Z location and a first pitch, yaw and roll orientation when referenced to the at least one display.

The 3D scene may include a rendering of at least one object at least partially visible from the first viewpoint within the 3D scene, and the 3D scene may include at least one 3D object rendered in stereo 3D.

A 2D scene may be presented by the at least one display. Presenting the 2D scene may include displaying at least one stereoscopic image of the 2D scene by the at least one display. The 2D scene and the 3D scene may be concurrently presented within the at least one display.

A first virtual viewpoint within the 3D scene may be determined, where the first virtual viewpoint is different than the first viewpoint. The first virtual view point may correspond to a first X, Y, and Z location and a first pitch, yaw and roll orientation in physical open space and may map to a first coordinate in the 3D scene, where the first coordinate includes a second X, Y, and Z location in the 3D scene, and where the first coordinate further includes a second pitch, yaw and roll orientation in the 3D scene.

A first region and a second region may be determined, where the first region correlates to the 3D scene, and where the second region is outside the 3D scene and includes the 2D scene.

A cursor may be presented in a 2D operational mode when the determined first virtual viewpoint is determined to be in the second region, and the cursor may be presented in a 3D appearance and position when the determined first virtual viewpoint is determined to be in the first region.

It should be noted that any of the features and details described above with respect to the methods of FIGS. 3A and 3B may also be incorporated in embodiments of the above method. More generally, any of the various features and limitations disclosed herein may be used in any combination desired.

In another implementation, the change in the user's viewpoint may alter the user's perspective and hence the system's rendering of the regions, independent of the positioning of the cursor. The cursor in this implementation may then be located in an alternate region and may operate or perform in accordance with the region that it is now within.

User Interactions in a 3D Presentation System

In some 3D presentation systems, a user may interact with the 3D scene, e.g., with objects in the 3D scene, e.g., identifying or selecting an object, and applying some operation to the object via a 3D pointing device, e.g., moving, rotating, or otherwise manipulating the object, or performing some other operation with respect to the device that may not change the object, e.g., moving a virtual camera or viewpoint in an orbit around some identified object while keeping the object in the center of the view.

When performing such an operation, e.g., rotating an object or performing any effect on an object (e.g., coloring, scaling, etc.) there is usually a control mechanism provided, e.g., a slider or a mouse gesture, to modulate the effect. In other words, for some effects or operations, the user may configure the degree to which, or rate at which, the effect is applied or manifested. Said another way, the user may be allowed to configure the rate of the effect, much as a user may configure the speed a cursor moves in response to a given movement of a mouse.

However, current techniques are limited to: using 2D mouse positioning for effecting speed of the effect, only one effect being controllable via the 2D mouse positioning, or a two step approach being required configure or control the rate of effect (e.g., adjust slider for speed setting, then use the mouse to control the effect at the speed set by the slider). The below describes a novel way to dynamically control effect rates via a 3D pointing device which has more than three degrees of freedom, according to various embodiments.

Figure 5:
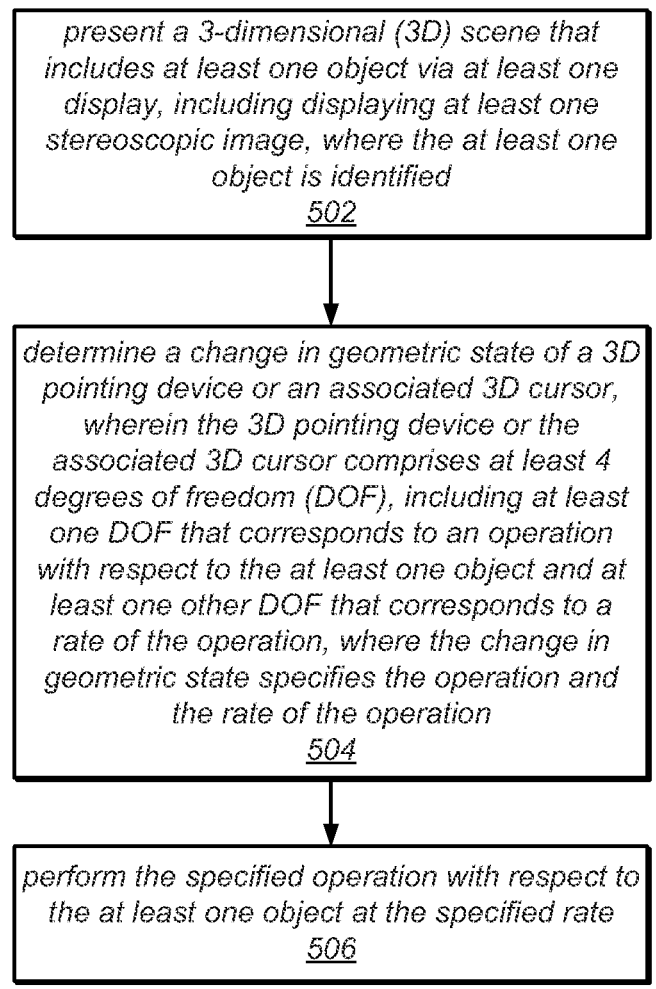
FIG. 5 is flowchart of a method for user interactions in a 3D presentation system using a 3D pointing device, according to some embodiments.

FIG. 5—Flowchart of a Method for User Interactions in a 3D Presentation System Using a 3D Pointing device FIG. 5 is flowchart of a method for user interactions in a 3D presentation system using a 3D pointing device, according to some embodiments. The method shown in FIG. 5 may be used in conjunction with any of the systems or devices described herein. In various embodiments, some of the method elements shown may be performed concurrently, in a different order than shown, or may be omitted. Additional method elements may also be performed as desired. As shown, the method may operate as follows.

In 502, a 3-dimensional (3D) scene that includes at least one object may be presented via at least one display, including displaying at least one stereoscopic image. The at least one object may be identified. Note that as used herein, the term "identified" means that the object has been distinguished, e.g., from other (unidentified or de-identified) objects. In some embodiments, being "identified" may indicate "pre-selection" of an object, where, for example, a 3D pointing device may be pointing at the object, e.g., positioning an associated 3D cursor on (or in) the object, where, for example, the object may be highlighted, but may not be selected (which may require clicking on the object, or releasing a button to complete such a click). In other embodiments, being "identified" may mean being "selected".

Figure 6A:
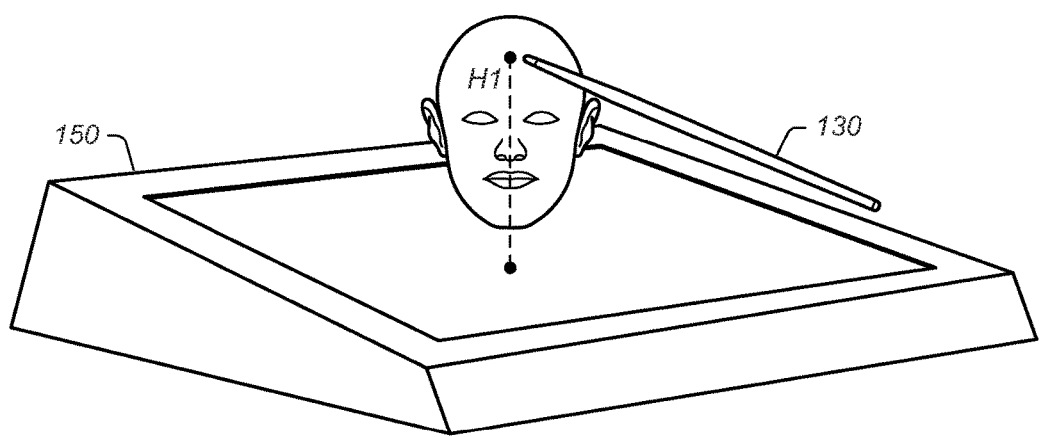
FIGS. 6A-6C illustrate exemplary user interactions in a 3D scene per the method of FIG. 5, according to some embodiments.

A simple exemplary 3D scene with at least one object is shown in FIG. 6A, specifically, a human head is shown displayed on (or above, e.g., via stereoscopic techniques) a horizontal display device 150B. The at least one object may be identified in response to an action performed with the 3D pointing device, being pointed to, clicked, or half-clicked (button press, no release), or selected.

Figure 6B:
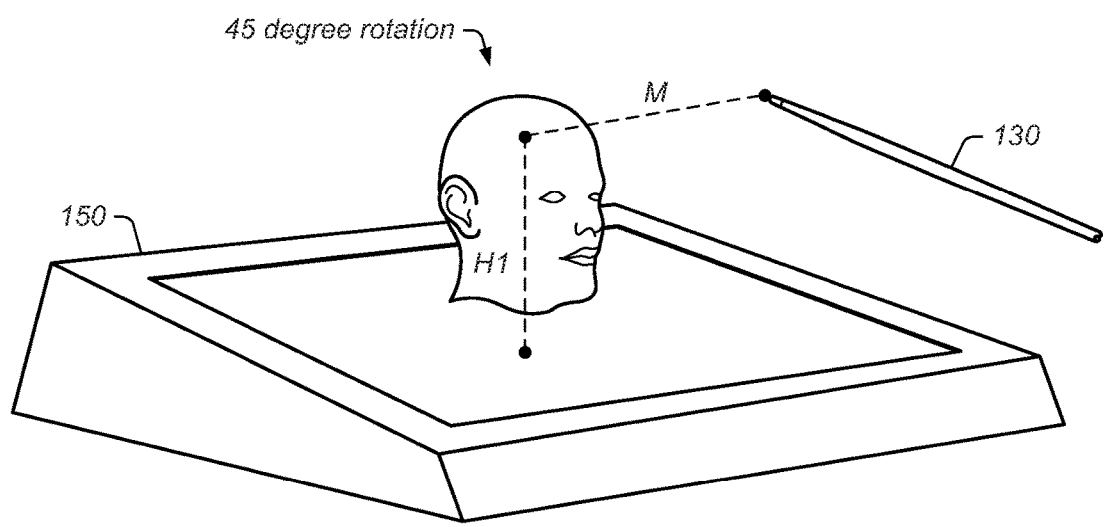
Figure 6C:
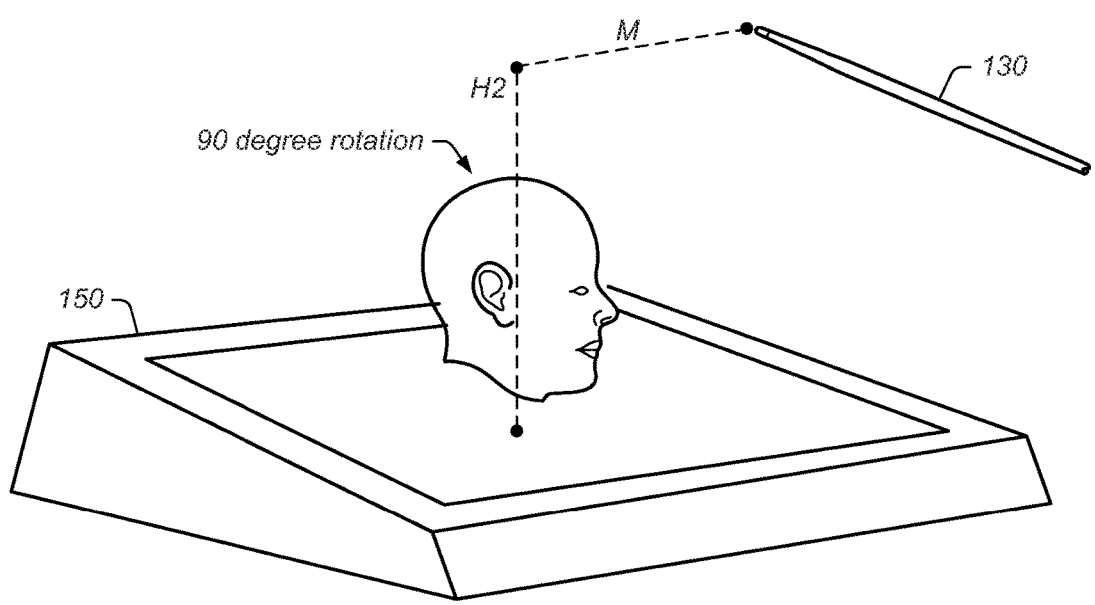

In 504, a change in geometric state of the 3D pointing device or an associated 3D cursor may be determined. The 3D pointing device may have at least 4 degrees of freedom (DOF), including at least one DOF that corresponds to an operation with respect to the at least one object, and at least one other DOF that corresponds to a rate of the operation. The change in geometric state may specify the operation and the rate of the operation. FIG. 6A illustrates a first geometric state (of the 3D pointing device or associated 3D cursor), and FIGS. 6B and 6C illustrate respective second geometric states, described below in more detail.

In some embodiments, the at least 4 degrees of freedom may correspond to a reference frame, and the change in geometric state may be or include a change in the reference frame. For example, in one embodiment, the at least 4 degrees of freedom may include position with respect to one or more spatial axes, and/or orientation with respect to the one or more spatial axes. Accordingly, the change in geometric state of the 3D pointing device or associated 3D cursor may include a change in position with respect to the one or more spatial axes and/or orientation with respect to the one or more spatial axes. In some embodiments, the at least 4 degrees of freedom may be or include 5 or 6 degrees of freedom. For example, the degrees of freedom may include 3 positional degrees of freedom, and 3 orientation degrees of freedom.

In 506, the specified operation may be performed with respect to the at least one object at the specified rate. In other words, the geometric state change with respect to the at least one DOF that corresponds to the operation may invoke the operation, and the geometric state change with respect to the at least one other DOF that corresponds to the rate of the operation may determine the rate at which the operation is performed.

Any of a variety of operations may be applied per the above, including for example, but not limited to, one or more of: rotation of the at least one object, movement (i.e., translation) of the at least one object, movement of a point of view (POV) with respect to the at least one object, e.g., movement of a virtual camera, scaling of the at least one object, color of the at least one object, brightness of the at least one object, or changing shape of the at least one object, among others.

In the exemplary embodiment of FIGS. 6A-6C, a rotation operation is performed in response to movement of the 3D cursor parallel to the display (screen) at a rate specified by the distance of the cursor from the display (screen). More specifically, in FIGS. 6A and 6B, the cursor the cursor is at a distance H1, as shown, and in FIG. 6B, the cursor has been moved (horizontally, to the right) a distance M, resulting in a 45 degree rotation around the vertical axis. Now, in FIG. 6C, the cursor is at a distance H2, with H2 greater than H1, and the resulting rotation of the object (head) based on the same movement M is 90 degrees. Of course, the operation and rates shown are exemplary only, and any other operations and rates may be utilized as desired.

Note that a corresponding movement, also horizontal (or more generally, parallel to the display), but perpendicular to the vertical axis, may result in a rotation around a different axis, e.g., a horizontal axis (in this horizontal display embodiment).

In some embodiments, at least two of the degrees of freedom may together correspond to the operation, and one other DOF may correspond to the rate of the operation. For example, in a rotation embodiment, the movement of the cursor may be oblique, e.g., with components along two different axes, e.g., x and y, and at a determined distance from the screen (e.g., normal to the screen, along the z axis) and the resulting rotation operation may thus be around an axis perpendicular to the movement, with the rotation amount for a given oblique movement of the cursor being specified by the z distance. In other words, the resulting rotation may be a combination of Euler angles.

In another embodiment, at least two of the degrees of freedom may together correspond respectively to components of the operation, but two other degrees of freedom may correspond respectively to components of the rate of the operation. In other words, in addition to operation components (e.g., rotation components, as described above), there may be rate components that may differ from one another. Thus, a given z distance may specify different rates for the different components of the rotation.

In a further embodiment, an orientation of the 3D point device or associated cursor, e.g., the angle of a stylus, may either effect the rate, or may determine scaling (e.g., based on the increments of say 10 degrees in one direction or another).

In some embodiment, the change in geometric state may be quantized by configurable increments. For example, the rate for an operation may change discretely and by a specified amount per each (specified) increment of the movement per the operation DOF(s). Moreover, in some embodiments, the 3D pointing device may be configurable, e.g., via a button, to change the increment, thereby setting the operation rate, e.g., scaling, at faster or slower rates.

It should be noted that in various embodiments, any of the techniques and mechanisms disclosed herein may be used in conjunction as desired. For example, in one exemplary embodiment that combines aspects of the method of FIG. 3A or 3B with that of FIG. 7, the 3D cursor (or pointing device's) rate specification via H (e.g., normal displacement from display screen) may not go into effect unless the position is outside the specified volume that specifies the 2D mode (for 2D GUI operations). Thus, if the plane defining the volume is, say, 10 mm (or 10 cm, etc.), then the rate determination may only occur when the cursor's distance from the display exceeds this value.

In some embodiments, one or more of the degrees of freedom may be configurable to be locked. Accordingly, the change in geometric state of the 3D pointing device or associated 3D cursor with respect to the locked one or more degrees of freedom may not change the operation or the rate of the operation.

In one embodiment, the change in geometric state may be a movement (or other change) with respect to an anchor point in the 3D scene or on the display. Thus, the change in geometric state may be with respect to this point. In various embodiments, the anchor point may be or include one or more of: a default position, a position of the at least one object, or a user-specified position, among others, as desired.

For example in one exemplary embodiment, the anchor point may be the center of the screen (or screen plane) by default. As another example, the anchor point may be the position of the identified or selected object. In another exemplary embodiment, the anchor point may be determined by the user by clicking on a position, e.g., in the 3D scene, where a subsequent movement invoking the operation may be with respect to this point.

In some embodiments, the anchor may be a reference frame, and may specify a value with respect to more than just spatial DOFs, e.g., may also be with respect to orientation with respect to one or more axes.

Identification of Objects in a 3D Scene

In many 3D presentation applications, there is a need to identify or select objects that are somehow related to an already identified object. For example, the identified object may be in an object hierarchy or sequence, and other objects in the hierarchy or sequence may need to be identified. However, sometimes the hierarchy (or other relationships) of objects is difficult to see, and therefore it may be difficult to indicate the appropriate objects with a cursor, e.g., when there is the need to select higher or lower level objects (in a hierarchy) from a current highlighted object, the user may be required to position the cursor exactly, e.g., extending the cursor to include the sought objects (objects of interest) within the hierarchical arrangement of objects. In addition prior art techniques that use a direct concatenated selection process of successively picking more and more objects to the collection may be cumbersome, especially with structures or hierarchies that have a large number of objects.

Regarding the various 3D techniques disclosed herein, it should be noted that in some stereoscopic 3D systems, i.e., systems that utilize stereo visioning techniques to simulate 3D viewing, the 3D cursor may be moved to positions above and below (or in front of, and behind) the display screen surface. In other words, positions of the 3D cursor may not be restricted to the volume in front of and adjacent to the display screen. Thus, for example, in some stereo visioning systems, some objects in a displayed 3D scene may be positioned in the plane of the screen, some may be positioned above or in front of the screen plane, and others may be positioned behind or below the screen plane. Accordingly, also using such stereo visioning techniques, the 3D cursor may be positioned by a user with respect to any of these objects, or with respect to any 2D or 3D point or reference frame, as desired.

FIG. 7—Flowchart of a Method for Identifying Objects in a 3D Scene via a 3D Pointing Device FIG. 7 is a flowchart diagram illustrating one embodiment of a method for identifying objects in a 3D scene, according to some embodiments. The method shown in FIG. 7 may be used in conjunction with any of the systems or devices described herein. In various embodiments, some of the method elements shown may be performed concurrently, in a different order than shown, or may be omitted. Additional method elements may also be performed as desired. As shown, the method may operate as follows.

In 702, a 3-dimensional (3D) scene that includes a plurality of objects may be presented via at least one display, including displaying at least one stereoscopic image. The plurality of objects may have spatial or associative relationships, and may include at least one identified object. As noted above, the term "identified" means that the object has been indicated or distinguished, e.g., from other (unidentified or de-identified) objects. As also mentioned above, in some embodiments, being "identified" may indicate "pre-selection" of an object, where, for example, a 3D pointing device may be pointing at the object, e.g., positioning an associated 3D cursor on (or in) the object, where, for example, the object may be highlighted, but may not be selected (which may require clicking on the object, or releasing a button to complete such a click); however, in further embodiments, being "identified" may mean being "selected".

In 704, one or more additional objects of the plurality of objects may be identified based on the spatial or associative relationships in response to a difference between a current reference frame of a 3D pointing device or an associated 3D cursor and an anchor reference frame, resulting in a plurality of identified objects. The reference frame of the 3D pointing device or associated 3D cursor and the anchor reference frame may be independent of positions of the at least one identified object and the plurality of identified objects.

Figure 8A:
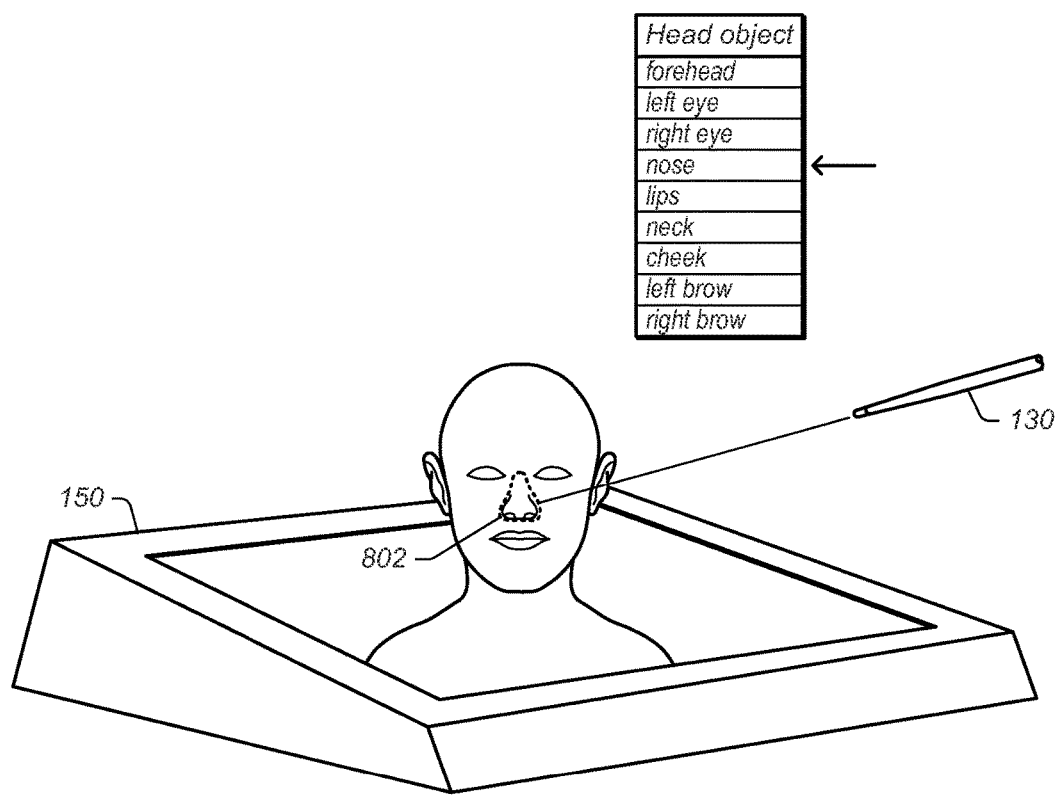
FIGS. 8A-8C illustrate exemplary identification of objects in a 3D scene per the method of FIG. 7, according to some embodiments.
Figure 8B:
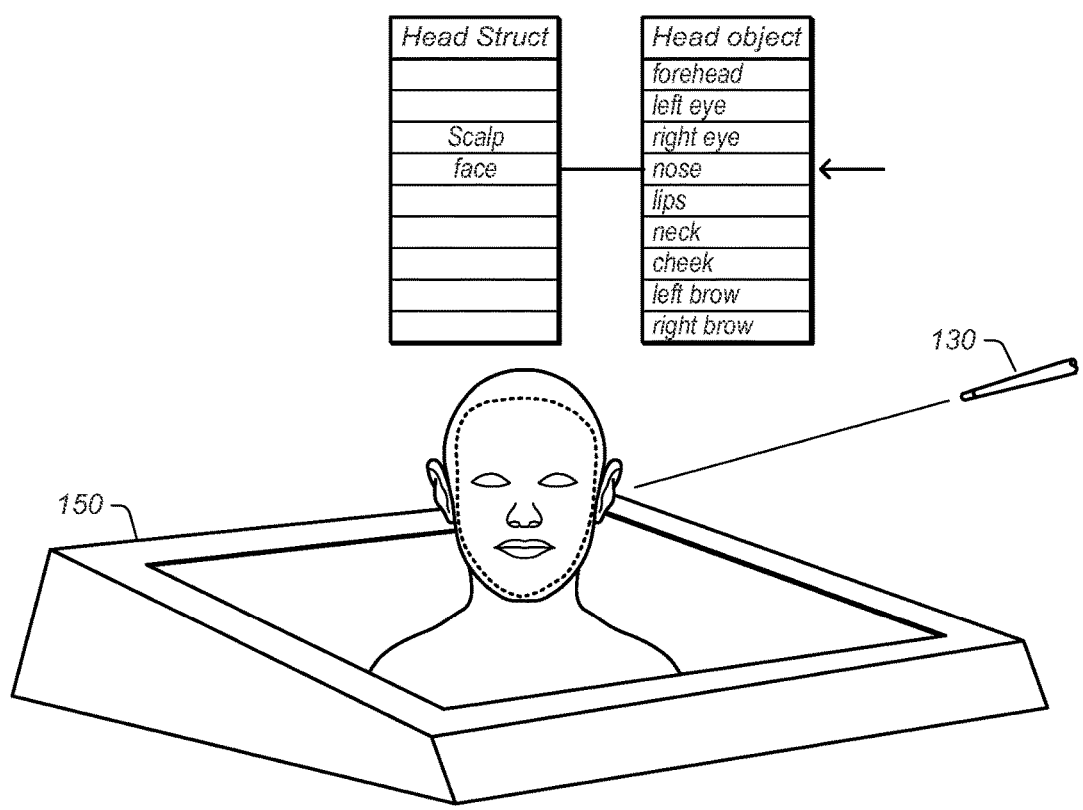
Figure 8C:
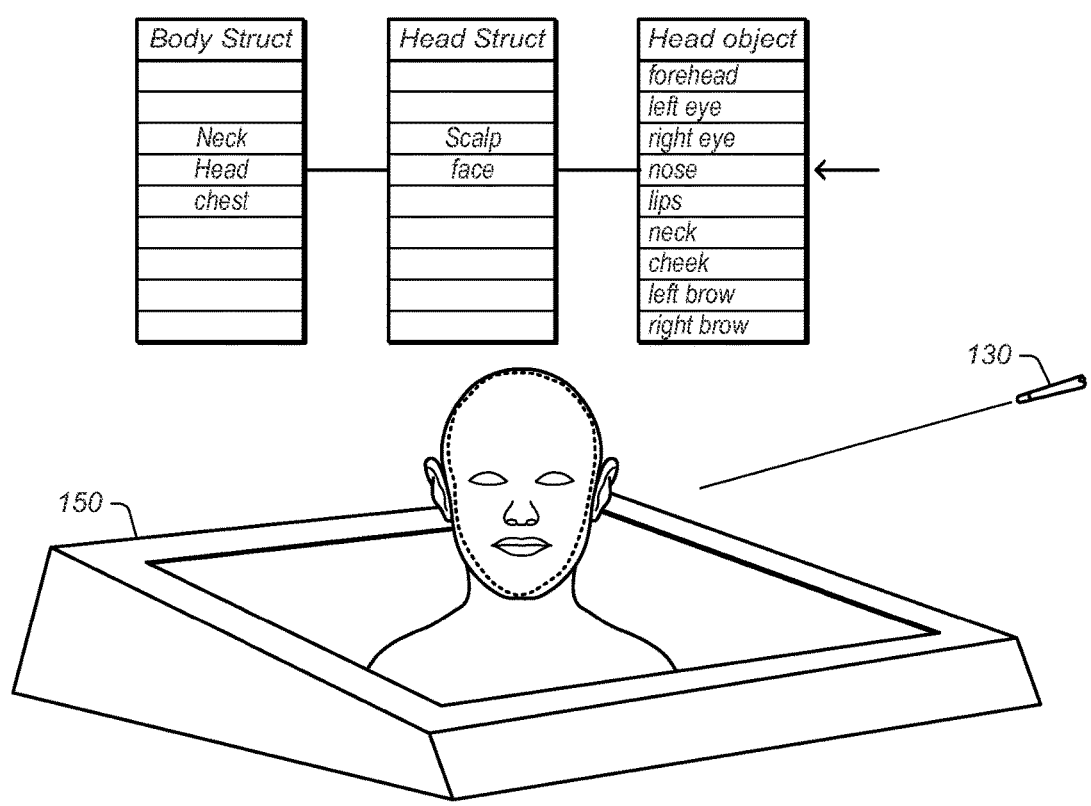

FIGS. 8A-8C illustrate exemplary identification of objects in a 3D scene per the method of FIG. 7, according to some embodiments. FIG. 8A illustrates display of an exemplary 3D scene with multiple objects composing a human bust (head, neck, and shoulders), which form an object hierarchy. As FIG. 8A shows, in this exemplary embodiment, the at least one identified object is nose 802, pointed to by the 3D pointing device 130, indicated by a dashed curve around the nose, and as further indicated in the object list shown above the head.

FIG. 8B illustrates identification of additional objects in the hierarchy one step or associative connection from the identified nose, specifically, a face object, in response to the 3D pointing device or cursor moving away from the nose (or display). Similarly, FIG. 8C illustrates identification of further additional objects in the hierarchy two steps or associative connections from the identified nose, specifically, adding a scalp object to the identified face (including nose) object, in response to the 3D pointing device or cursor moving away from the nose (or bust, or display).

Describing the above exemplary embodiment in a slightly different manner, FIG. 8A shows that the nose was selected. Then from a particular position, the user starts to move the cursor away from the nose. The system knows the hierarchical structure of the objects, and further knows that the next higher elemental object in the hierarchy is the face. Accordingly, FIG. 8B illustrates the moved away position of the cursor and the corresponding highlighting (via dashed border) of the face (which is higher up the hierarchy from the nose) and hence the whole of the face, including the eyes, cheek brow, forehead. Then as the cursor is pulled away further, as shown in FIG. 8C, the hierarchy of objects identified expands to the head, including face and scalp. Note that if the cursor were pulled away even further (not shown), the identified objects may include all of the body hierarchy or structure, e.g., including neck and chest.

Note that in other embodiments, this technique may be used with 2D scenes and/or with a 2D pointing device, such as a conventional mouse.

In various applications, different scenarios or relationships may be defined for objects within a space, in a hierarchy, or sequence, e.g., a temporal sequence (such as an animation sequence), or any combination. In other words, the spatial or associative relationships comprise a spatial arrangement of the plurality of objects, a hierarchy of the plurality of objects, a temporal sequence of the plurality of objects, and/or a network of objects.

Similar to the technique of the method of FIG. 5, in some embodiments, the reference frame or the anchor reference frame may correspond to at least 4 degrees of freedom, and in some embodiments, may include 5 or 6 DOFs, as desired (or even more, dependent on the pointing device and display technology). Thus, for example, in some embodiments, the difference between the current reference frame of the 3D pointing device or associated 3D cursor and the anchor reference frame may include position with respect to one or more spatial axes and/or orientation with respect to the one or more spatial axes. The anchor point may include one or more of: a default position or orientation, a position or orientation of the at least one object, or a user-specified position or orientation.

For example, in one exemplary embodiment directed to simple spatial arrangements of objects, e.g., where objects may be in proximity to each other or even within each other, but not part of a defined hierarchy, a user may identify or select one object, then may place the cursor at a starting point and move away from the object, resulting in identification (or selection) of other objects in proximity to the initially identified (or selected) object, e.g., either one-to-one correspondence or in a scaled manner (e.g., per the techniques described above with respect to the method of FIG. 5). In other words, as the user moves the cursor in a specified direction (or otherwise changes the reference frame of the pointing device with respect to one or more specified DOFs), objects closest to the initially identified object may be identified, then the next nearest, and so forth. Note that the direction and or movement of the cursor may be independent of the placement (positions) of the objects.

In one embodiment, the at least one identified object may be or include multiple identified objects, and the method may de-select one or more of the multiple identified objects in response to a difference between another current reference frame of the 3D pointing device or associated 3D cursor and the anchor reference frame, resulting in de-identification of at least one object of the multiple identified objects, where, similar to above, the other current reference frame of the 3D pointing device or associated 3D cursor and the anchor reference frame may be independent of positions of the multiple identified objects. In other words, in one embodiment following the above example, if many objects are already identified (or selected), then as the cursor is moved closer to the identified or selected grouping of objects (e.g., towards the center of the grouping) or towards a reference point or frame of reference (e.g., towards an anchor point or reference frame), the outer objects may becoming de-identified (or de-selected), followed by other objects closer to the center, as the movement continues. In other words, in one embodiment, movement in one direction may progressively identify further objects (e.g., from the inside out), and movement in the opposite direction may de-identify (or de-select) objects (e.g., from the outside in).

In an exemplary embodiment directed to an object within a hierarchy of objects, the user may select one object within the hierarchy, then place the cursor at a starting point and move away from the object, which may result in identification of objects higher up the hierarchy. Conversely, by moving the cursor closer to the selection of objects (or towards the center of the identified object or group of objects), successive outer level objects may be de-identified or de-selected, again, either with a one-to-one correspondence or in a scaled manner.

In an embodiment directed to timed events, e.g., a temporal sequence, such as in an animation, based on a selected object (e.g., frame) at a particular time, as the cursor is moved away from the object, then one or more time conditions (increasing or decreasing in time or both simultaneously may be selected and added (or subtracted) from the identified (or selected) group. Of course, in other embodiments, any of the above embodiments may be used in any combinations desired.

As mentioned above, in some embodiments, the identification technique may be implemented using standard 2D tools (e.g., a mouse), where the 2D placement of the cursor may determine the hierarchical identification and de-identification (or selection and de-selection). Similarly, in stereoscopic 3-space (e.g., a 3D scene imaged in stereo), the proximity of the pointing device or associated cursor and its movement may effect the hierarchy/spatial/temporal identification or de-identification (or selection or de-selection).

Also, there may be button controls to shift state of the selection. For example, the selection may only occur when a button is depressed as the cursor position is moved.

Thus, embodiments of the above technique may implement 2D or 3D cursor position based identification or selection of objects in a spatial or temporal hierarchy or other associative relationship, e.g., a network, where the position of the moving cursor is independent of the location of the objects being selected (or de-selected) in relation to its position to the cursor.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer accessible memory medium that stores program instructions executable by a processor to implement:
    display a 3-dimensional (3D) stereoscopic scene via at least one stereoscopic display device;
    determine a current position of a cursor with respect to the at least one stereoscopic display device based on a position of a 6 degree of freedom (6DOF) 3D pointing device with respect to the at least one stereoscopic display device; and
    display the cursor via the at least one stereoscopic display device concurrent with display of the 3D stereoscopic scene;
    wherein in response to the current position being inside a specified volume proximate to the at least one stereoscopic display device, the program instructions are further executable by the processor to implement display of a 2 dimensional (2D) scene via the at least one stereoscopic display device concurrent with display of the 3D stereoscopic scene, wherein at least a portion of the 2D scene overlaps at least a portion of the 3D stereoscopic scene, wherein the cursor operates in a 2D mode, wherein the entire 2D scene is displayed within a plane of a screen of the at least one stereoscopic display device, wherein the specified volume is bounded by a plane parallel to a screen of the at least one stereoscopic display device, wherein the plane is a specified non-zero distance from the screen, wherein the specified volume is on the screen side of the plane, wherein boundaries of the specified volume are defined by boundaries of the at least one stereoscopic display device, and wherein, in the 2D mode, the cursor is usable to interact with the 2D scene; and
    wherein in response to the current position being outside the specified volume proximate to the at least one stereoscopic display device, the program instructions are further executable by the processor to implement removal of the display of the 2D scene, wherein the cursor operates in a 3D mode, wherein, in the 3D mode, the cursor is usable to interact with the 3D stereoscopic scene.

2. The non-transitory computer accessible memory medium of claim 1, wherein the specified volume defines a first region and space outside the specified volume defines a second region, and wherein the second region is displayed as inactive when the cursor is in the first region.

3. The non-transitory computer accessible memory medium of claim 1, wherein the 2D scene comprises a graphical user interface (GUI) that includes one or more 2D user interface (UI) elements, and wherein, in being usable to interact with the 2D scene, the cursor is usable to interact with the one or more 2D UI elements at zero parallax.

4. The non-transitory computer accessible memory medium of claim 3, wherein the specified volume is further defined by respective bounding volumes proximate to each of one or more 2D user interface (UI) elements on the at least one stereoscopic display device.

5. The non-transitory computer accessible memory medium of claim 1, wherein the specified volume is further defined by exclusion of a respective bounding volume of at least one object in the 3D stereoscopic scene.

6. The non-transitory computer accessible memory medium of claim 1,
wherein the 3D stereoscopic scene includes at least one 3D graphical object; and
wherein, in being usable to interact with the 3D stereoscopic scene, the cursor is usable to interact with the at least one 3D graphical object at zero, positive, or negative parallax.

7. The non-transitory computer accessible memory medium of claim 1, wherein in being based on the position of the 6DOF 3D pointing device, the current position of the cursor is based on a virtual beam extending from the position of the 6DOF 3D pointing device.

8. The non-transitory computer accessible memory medium of claim 7, wherein the virtual beam has a configurable length.

9. The non-transitory computer accessible memory medium of claim 7, wherein a distal end of the virtual beam comprises a virtual stylus tip, and wherein the cursor corresponds to the virtual stylus tip.

10. The non-transitory computer accessible memory medium of claim 1, wherein the 6DOF 3D pointing device comprises a physical stylus, and wherein the cursor corresponds to a tip of the physical stylus.

11. The non-transitory computer accessible memory medium of claim 1, wherein in the 2D mode the cursor is displayed in the 2D scene with a first representation, and wherein in the 3D mode the cursor is displayed in the 3D stereoscopic scene with a second representation, wherein the second representation is different from the first representation.

12. A system, comprising:
a processor;
at least one stereoscopic display device coupled to the processor;
a 6 degree of freedom (6DOF) 3D pointing device coupled to the processor, and configured to specify a current position of a cursor with respect to the at least one stereoscopic display device based on a position of the 6DOF 3D pointing device with respect to the at least one stereoscopic display device; and
a memory medium coupled to the processor that stores program instructions executable by the processor to:
display a 3-dimensional (3D) stereoscopic scene via the at least one stereoscopic display device;
display the cursor via the at least one stereoscopic display device concurrent with display of the 3D stereoscopic scene;
wherein in response to the current position being inside a specified volume proximate to the at least one stereoscopic display device, the program instructions are further executable by the processor to display a 2 dimensional (2D) scene via the at least one stereoscopic display device concurrent with display of the 3D stereoscopic scene, wherein at least a portion of the 2D scene overlaps at least a portion of the 3D stereoscopic scene, wherein the cursor operates in a 2D mode, wherein the entire 2D scene is displayed within a plane of a screen of the at least one stereoscopic display device, wherein the specified volume is defined by a plane parallel to a screen of the at least one stereoscopic display device, wherein the plane is a specified non-zero distance from the screen, wherein the specified volume is on the screen side of the plane, wherein boundaries of the specified volume are defined by boundaries of the at least one stereoscopic display device, and wherein, in the 2D mode, the cursor is usable to interact with the 2D scene; and
wherein in response to the current position being outside the specified volume proximate to the at least one stereoscopic display device, the program instructions are further executable by the processor to remove display of the 2D scene, wherein the cursor operates in a 3D mode, wherein, in the 3D mode, the cursor is usable to interact with the 3D stereoscopic scene.

13. The system of claim 12, wherein the specified volume defines a first region and space outside the specified volume defines a second region, and wherein the second region is displayed as inactive when the cursor is in the first region.

14. The system of claim 12, wherein the 2D scene comprises a graphical user interface (GUI) that includes one or more 2D user interface (UI) elements, and wherein, in being usable to interact with the 2D scene, the cursor is usable to interact with the one or more 2D UI elements.

15. The system of claim 14, wherein the specified volume is further defined by respective bounding volumes proximate to each of one or more 2D user interface (UI) elements on the at least one stereoscopic display device.

16. The system of claim 12, wherein the specified volume is further defined by exclusion of a respective bounding volume of at least one object in the 3D stereoscopic scene.

17. The system of claim 12,
wherein the 3D stereoscopic scene includes at least one 3D graphical object; and
wherein, in being usable to interact with the 3D stereoscopic scene, the cursor is usable to interact with the at least one 3D graphical object.

18. The system of claim 12, wherein in being based on the position of a 6 degree of freedom (6DOF) 3D pointing device, the current position of the cursor is based on a virtual beam extending from the position of the 6DOF 3D pointing device.

19. The system of claim 18, wherein the virtual beam has a configurable length.

20. The system of claim 18, wherein a distal end of the virtual beam comprises a virtual stylus tip, and wherein the cursor corresponds to the virtual stylus tip.

21. The system of claim 12, wherein the 6DOF 3D pointing device is a physical stylus, and wherein the cursor corresponds to a tip of the physical stylus.

22. The system of claim 12, wherein in the 2D mode the cursor is displayed in the 2D scene with a first representation, and wherein in the 3D mode the cursor is displayed in the 3D stereoscopic scene with a second representation, wherein the second representation is different from the first representation.

23. A method, comprising:
displaying a 3-dimensional (3D) stereoscopic scene via at least one stereoscopic display device;
determining a current position of a cursor with respect to the at least one stereoscopic display device based on a position of a 6 degree of freedom (6DOF) 3D pointing device with respect to the at least one stereoscopic display device; and
displaying the cursor via the at least one stereoscopic display device concurrent with display of the 3D stereoscopic scene;

wherein in response to the current position being inside a specified volume proximate to the at least one stereoscopic display device, the method further comprises displaying a 2 dimensional (2D) scene via the at least one stereoscopic display device concurrent with display of the 3D stereoscopic scene, wherein at least a portion of the 2D scene overlaps at least a portion of the 3D stereoscopic scene, wherein the cursor operates in a 2D mode, wherein the entire 2D scene is displayed within a plane of a screen of the at least one stereoscopic display device, wherein the specified volume is defined by a plane parallel to a screen of the at least one stereoscopic display device, wherein the plane is a specified non-zero distance from the screen, wherein the specified volume is on the screen side of the plane, wherein boundaries of the specified volume are defined by boundaries of the at least one stereoscopic display device, and wherein, in the 2D mode, the cursor is usable to interact with the 2D scene; and wherein in response to the current position being outside the specified volume proximate to the at least one stereoscopic display device, the method further comprises removing display of the 2D scene, wherein the cursor operates in a 3D mode, wherein, in the 3D mode, the cursor is usable to interact with the 3D stereoscopic scene.

24. A method comprising:

presenting a 3-dimensional (3D) scene by at least one display, wherein said presenting the 3D scene comprises displaying at least one stereoscopic image of the 3D scene by the at least one display, wherein the 3D scene is presented according to a first viewpoint with respect to the at least one display, and wherein the 3D scene correlates to a physical open space;

wherein the first viewpoint has a first viewpoint X, Y, and Z location and a first pitch, yaw and roll orientation when referenced to the at least one display;

wherein the 3D scene includes a rendering of at least one object at least partially visible from the first viewpoint within the 3D scene, where the 3D scene includes at least one 3D object rendered in stereo 3D;

determining a first virtual viewpoint within the 3D scene, wherein the first virtual viewpoint is different than the first viewpoint, wherein the first virtual view point corresponds to a first X, Y, and Z location and a first pitch, yaw and roll orientation in physical open space and maps to a first coordinate in the 3D scene, wherein the first coordinate comprises a second X, Y, and Z location in the 3D scene, and wherein the first coordinate comprises a second pitch, yaw and roll orientation in the 3D scene;

determining a first region and a second region, wherein the first region correlates to the 3D scene, wherein the second region is outside the 3D scene, and wherein the second region is bounded by a plane parallel to a screen of the at least one display, wherein the plane is a specified non-zero distance from the screen, wherein the specified volume is on the screen side of the plane, and wherein boundaries of the second region are defined by boundaries of the at least one display;

presenting a 2D scene comprised in the second region and a cursor in a 2D operational mode when the determined first virtual viewpoint is determined to be in the second region, wherein at least a portion of the 2D scene overlaps at least a portion of the 3D scene; and presenting the cursor in a 3D appearance and position and removing the 2D scene from the presentation when the determined first virtual viewpoint is determined to be in the first region.

25. The method of claim 24, wherein the 2D scene comprises a graphical user interface (GUI) that includes one or more 2D user interface (UI) elements, and wherein the cursor in the 2D operational mode is usable to interact with the one or more 2D UI elements at zero parallax.

26. The method of claim 24, wherein the 3D scene includes at least one 3D graphical object; and wherein the cursor in the 3D operational mode is usable to interact with the at least one 3D graphical object at zero, positive, or negative parallax.

27. The method of claim 23, wherein the specified volume defines a first region and space outside the specified volume defines a second region, and wherein the second region is displayed as inactive when the cursor is in the first region.

28. The method of claim 23, wherein the 2D scene comprises a graphical user interface (GUI) that includes one or more 2D user interface (UI) elements, and wherein, in being usable to interact with the 2D scene, the cursor is usable to interact with the one or more 2D UI elements.

* * * * *